(12) United States Patent
Peng et al.

(10) Patent No.: US 8,961,067 B1
(45) Date of Patent: Feb. 24, 2015

(54) FLEXIBLE WAVE-ENERGY DISSIPATION SYSTEM

(71) Applicants: Ta-Hsiung Peng, Kaohsiung (TW); Kuang-Tsung Peng, Kaohsiung (TW); Kuang-Chin Peng, Kaohsiung (TW)

(72) Inventors: Ta-Hsiung Peng, Kaohsiung (TW); Kuang-Tsung Peng, Kaohsiung (TW); Kuang-Chin Peng, Kaohsiung (TW)

( * ) Notice: Subject to any disclaimer, the term of this patent is extended or adjusted under 35 U.S.C. 154(b) by 0 days.

(21) Appl. No.: 14/168,234

(22) Filed: Jan. 30, 2014

(51) Int. Cl.
*E02B 3/06* (2006.01)

(52) U.S. Cl.
CPC ........................................ *E02B 3/06* (2013.01)
USPC .................................. 405/35; 405/30; 405/25

(58) Field of Classification Search
CPC .......... E02B 3/04; E02B 3/06; E02B 2201/04
USPC .................. 405/21, 25, 27, 29, 20, 33, 35
See application file for complete search history.

(56) References Cited

U.S. PATENT DOCUMENTS

| | | | | |
|---|---|---|---|---|
| 227,483 A * | 5/1880 | Case | ............................... | 405/35 |
| 2,068,537 A * | 1/1937 | Dorn | ............................... | 405/28 |
| 3,953,977 A * | 5/1976 | Kikui et al. | ...................... | 405/27 |
| 4,384,456 A * | 5/1983 | Boros | ............................... | 405/28 |
| 5,636,939 A * | 6/1997 | Brown | ............................. | 405/30 |
| 5,899,632 A * | 5/1999 | Martin | ............................. | 405/25 |
| 8,511,936 B2 * | 8/2013 | Van de Riet et al. | ............. | 405/35 |
| 2008/0310919 A1 * | 12/2008 | Kyung | ............................. | 405/21 |
| 2010/0196098 A1 * | 8/2010 | Danskine et al. | ............... | 405/25 |
| 2012/0195685 A1 * | 8/2012 | Van de Riet et al. | ............. | 405/15 |

* cited by examiner

*Primary Examiner* — Frederick L Lagman
(74) *Attorney, Agent, or Firm* — Shook Hardy & Bacon LLP

(57) ABSTRACT

A flexible wave-energy dissipation system includes: a plurality of brace units arranged along a horizontal direction and each including front and rear braces; a plurality of energy-dissipating posts each disposed between the front and rear braces of the corresponding brace unit and including a first spring unit connected to the front brace of the corresponding brace unit and a rod body connected to the first spring unit; a plurality of hanging cable units each connected to one front brace, one rear brace and one rod body, such that the posts are inclined upwardly and rearwardly; and an energy dissipation device including an energy-dissipating net unit disposed between two adjacent posts, and a plurality of second spring units connected between the net unit and the two adjacent posts.

20 Claims, 20 Drawing Sheets

FLEXIBLE WAVE-ENERGY DISSIPATION SYSTEM

BACKGROUND OF THE INVENTION

1. Field of the Invention

This invention relates to a protection system, and more particularly to a flexible wave-energy dissipation system for protecting a coast from erosion.

2. Description of the Related Art

Most conventional processes for protecting a coast from erosion are performed using rigid constructions, such as a seawall, a jetty, a revetment, an offshore dike swarm, etc., so as to change the characteristic of wave or tide. Such a rigid construction, however, has negative effects on ecology and nature landscape, and is damaged easily by strong waves and Typhoon winds, thereby losing its protection function. To solve these problems, currently, many flexible wave-energy dissipation constructions (e.g., an artificial underwater reef, an artificial cape bay, a fishtail type bulwark, and an artificial beach nourishment) are available.

SUMMARY OF THE INVENTION

The object of this invention is to provide a flexible wave-energy dissipation system that can be disposed at a coast for diminishing the wave energy and that arrests and accumulates sea sands on the coastal bed.

According to this invention, there is provided a flexible wave-energy dissipation system comprising:

a plurality of brace units spaced apart from each other along a horizontal direction, each of the brace units including a front brace and a rear brace disposed behind the front brace;

a plurality of inclined energy-dissipating posts each disposed between the front and rear braces of a respective one of the brace units, each of the inclined energy-dissipating posts including a first spring unit connected to a respective one of the front braces of the brace units, and a rod body having a lower end that is connected to the first spring unit and extending toward a respective one of the rear braces of the brace units;

a plurality of hanging cable units each disposed between the front and rear braces of the respective one of the brace units, each of the hanging cables being connected to a respective one of the inclined energy-dissipating posts such that the respective one of the inclined energy-dissipating posts is inclined upwardly and rearwardly; and at least one energy dissipation device including an energy-dissipating net unit disposed between two adjacent ones of the inclined energy-dissipating posts along the horizontal direction, and a plurality of second spring units each connected between the energy-dissipating net unit and an adjacent one of the inclined energy-dissipating posts.

As such, since the energy-dissipating net unit has a porous structure, the wave energy can be diminished by the energy-dissipating net unit. Furthermore, if sea sands are carried by the waves to pass through the energy-dissipating net unit, a majority thereof will be left on the coastal bed when the waves return.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
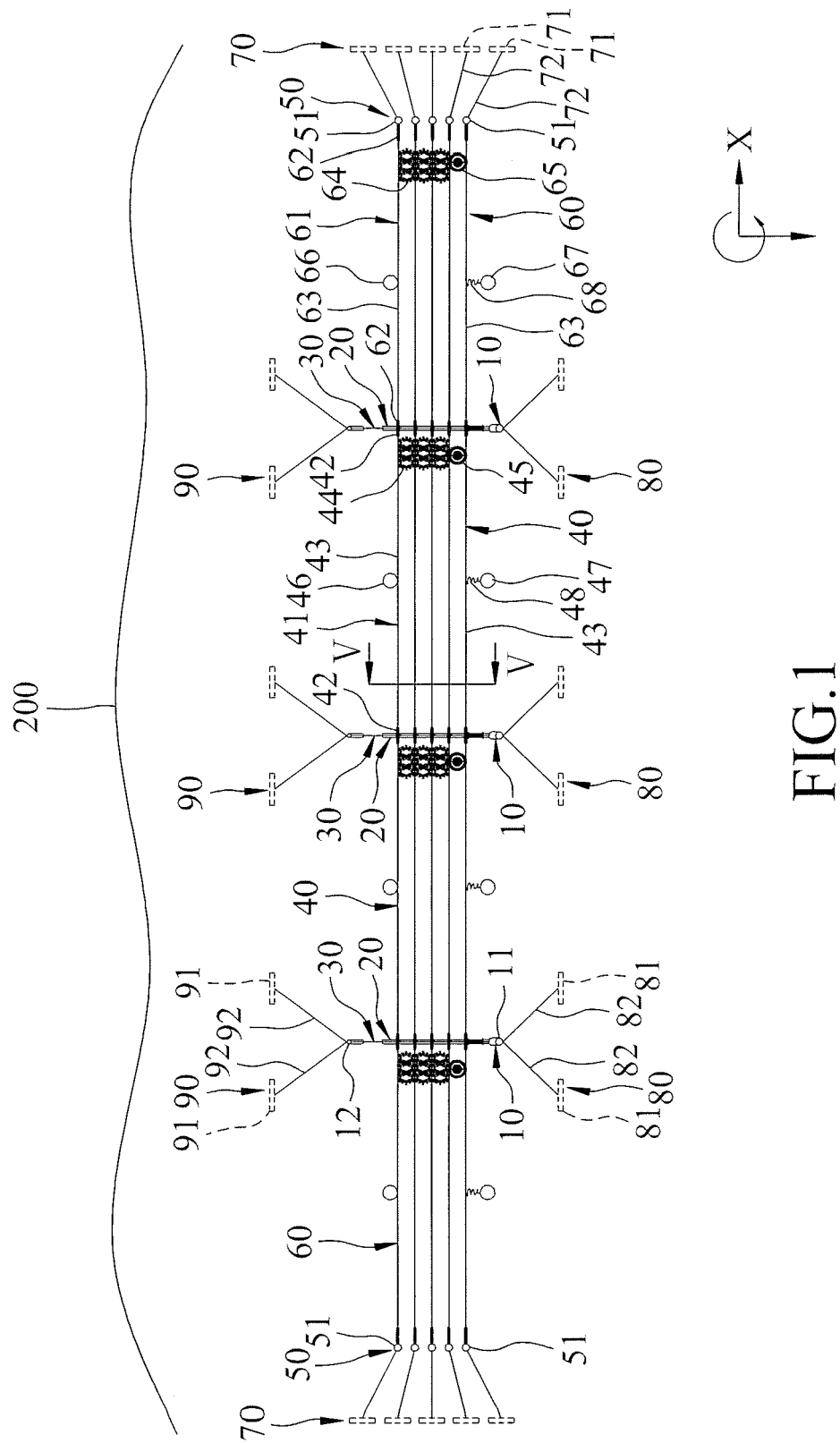
FIG. 1 is a top view of the first preferred embodiment of a flexible wave-energy dissipation system according to this invention when it is disposed on a coast.

Before the present invention is described in greater detail in connection with the preferred embodiments, it should be noted that similar elements and structures are designated by like reference numerals throughout the entire unit disclosure.

Figure 2:
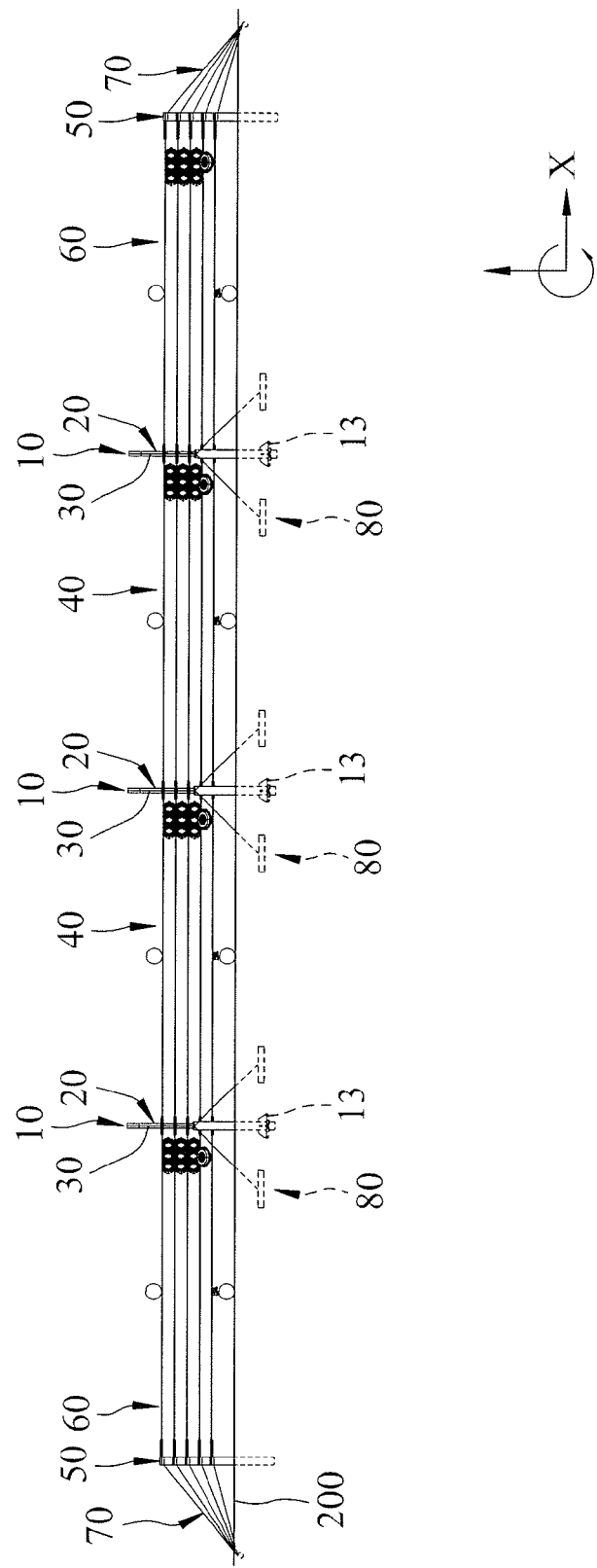
FIG. 2 is a front view of the first preferred embodiment.

Referring to FIGS. 1 and 2, the first preferred embodiment of a flexible wave energy dissipation system according to this invention is disposed at a coast 200, and includes three brace units 10, three inclined energy-dissipating posts 20, three hanging cable units 30, two first energy dissipation devices 40, two positioning devices 50, two second energy dissipation devices 60, two lateral pile devices 70, three front pile devices 80 disposed in front of the brace units 10, and three rear pile devices 90 disposed behind the brace units 10.

Figure 3:
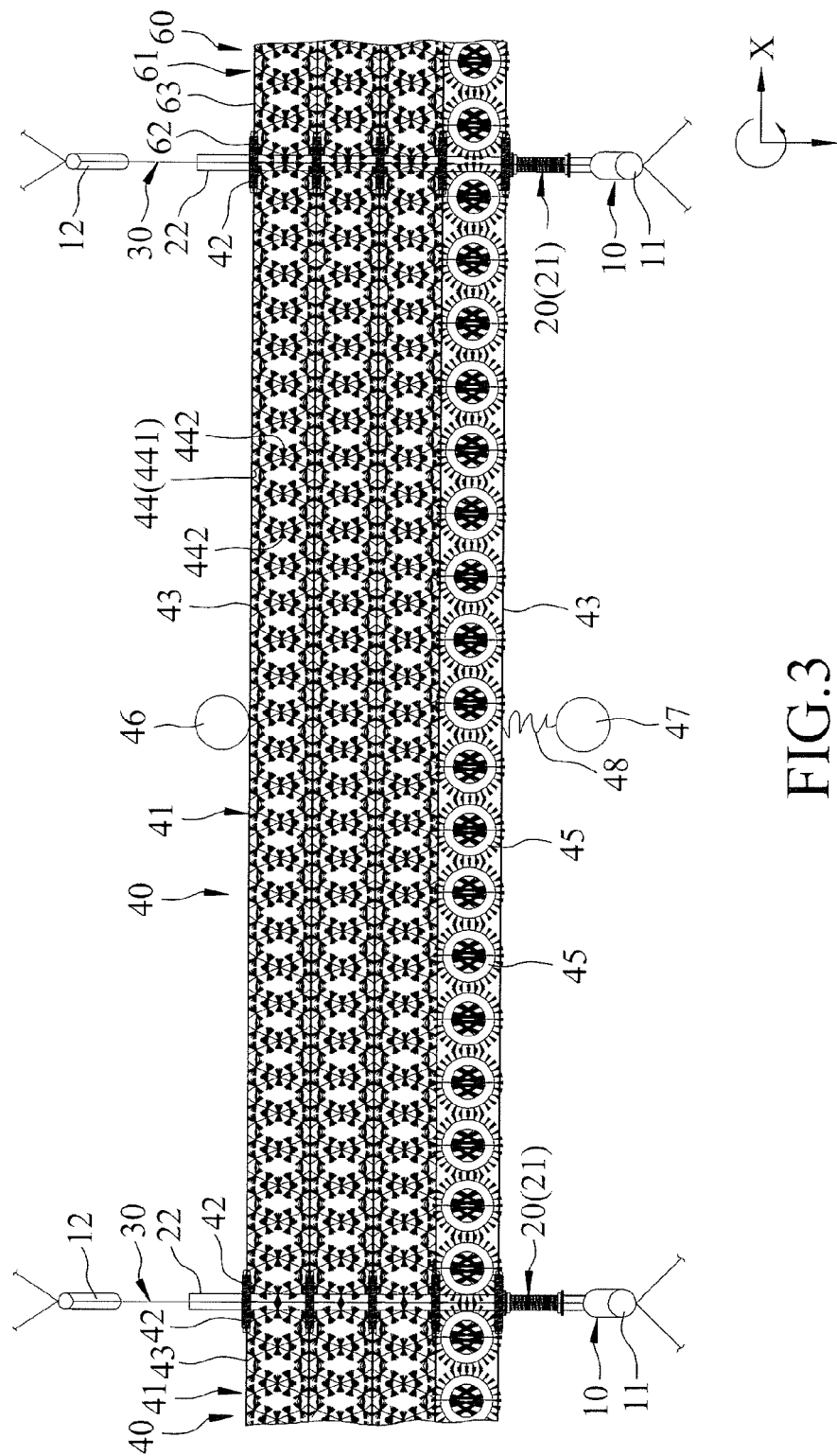
FIG. 3 is a fragmentary top view of the first preferred embodiment, illustrating a first energy dissipation device.
Figure 4:
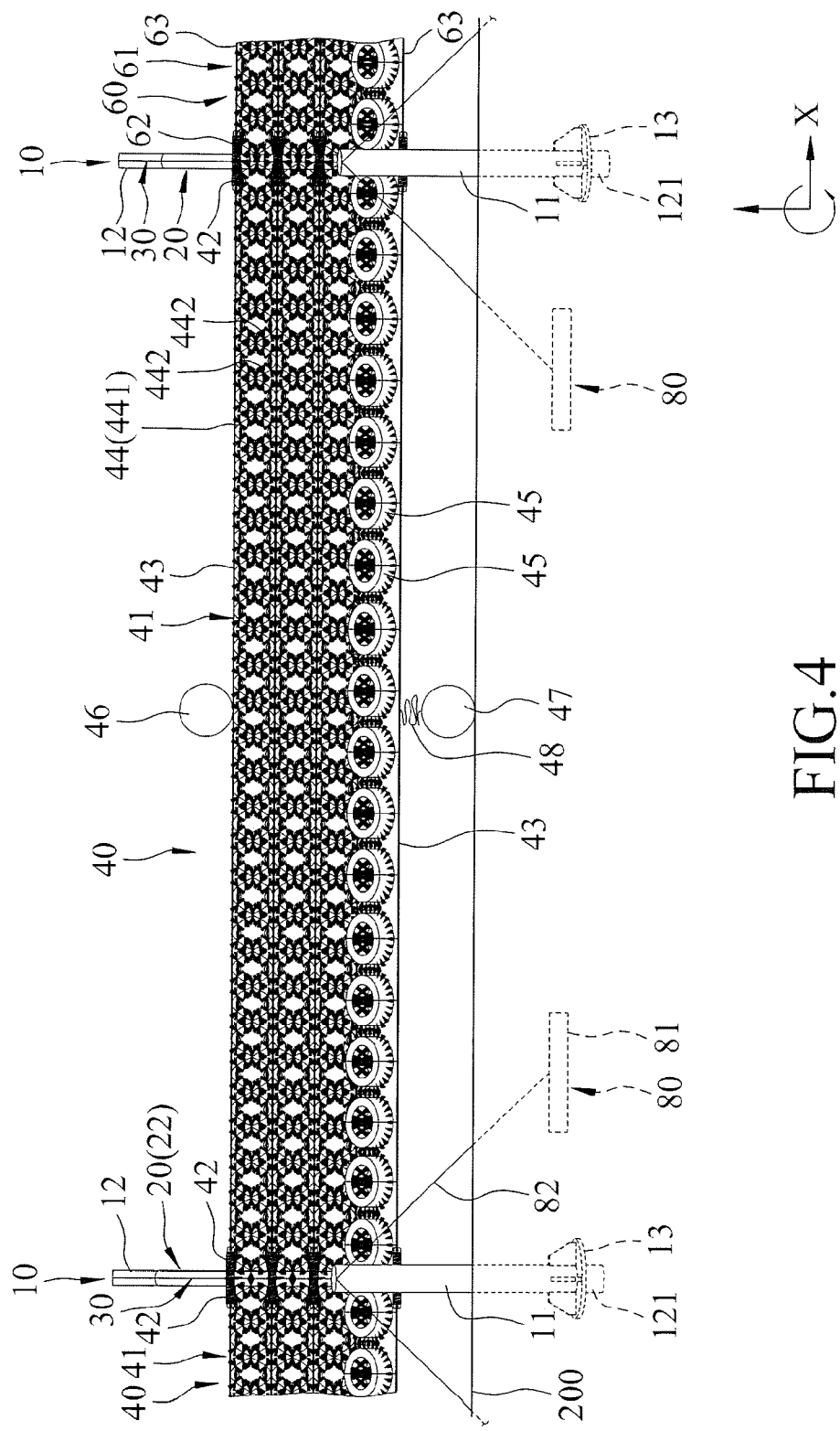
FIG. 4 is a fragmentary front view of the first preferred embodiment, illustrating the first energy dissipation device.
Figure 5:
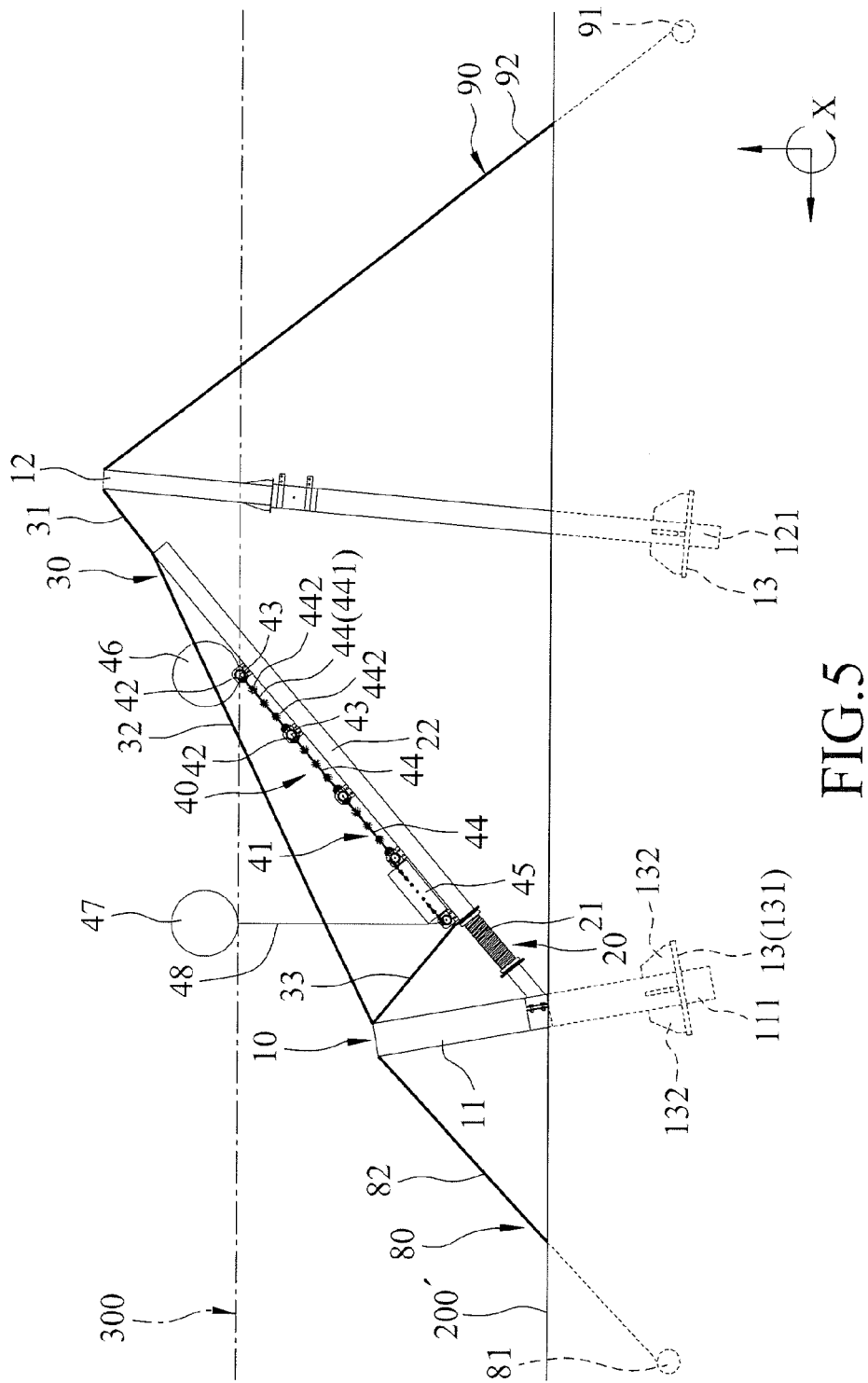
FIG. 5 is a sectional view taken along line V-V in FIG. 1.
Figure 6:
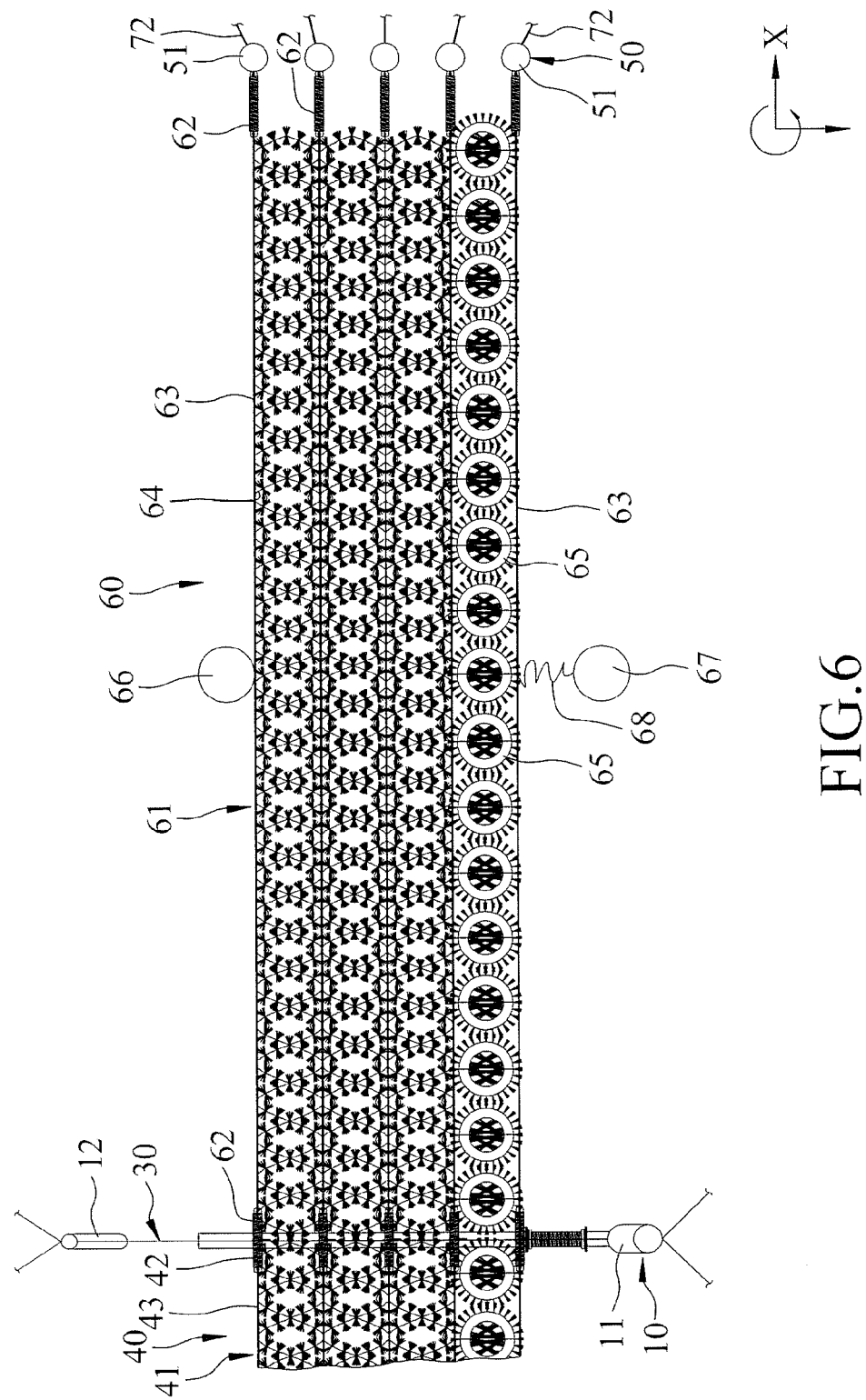
FIG. 6 is a fragmentary top view of the first preferred embodiment, illustrating a second energy dissipation device.
Figure 7:
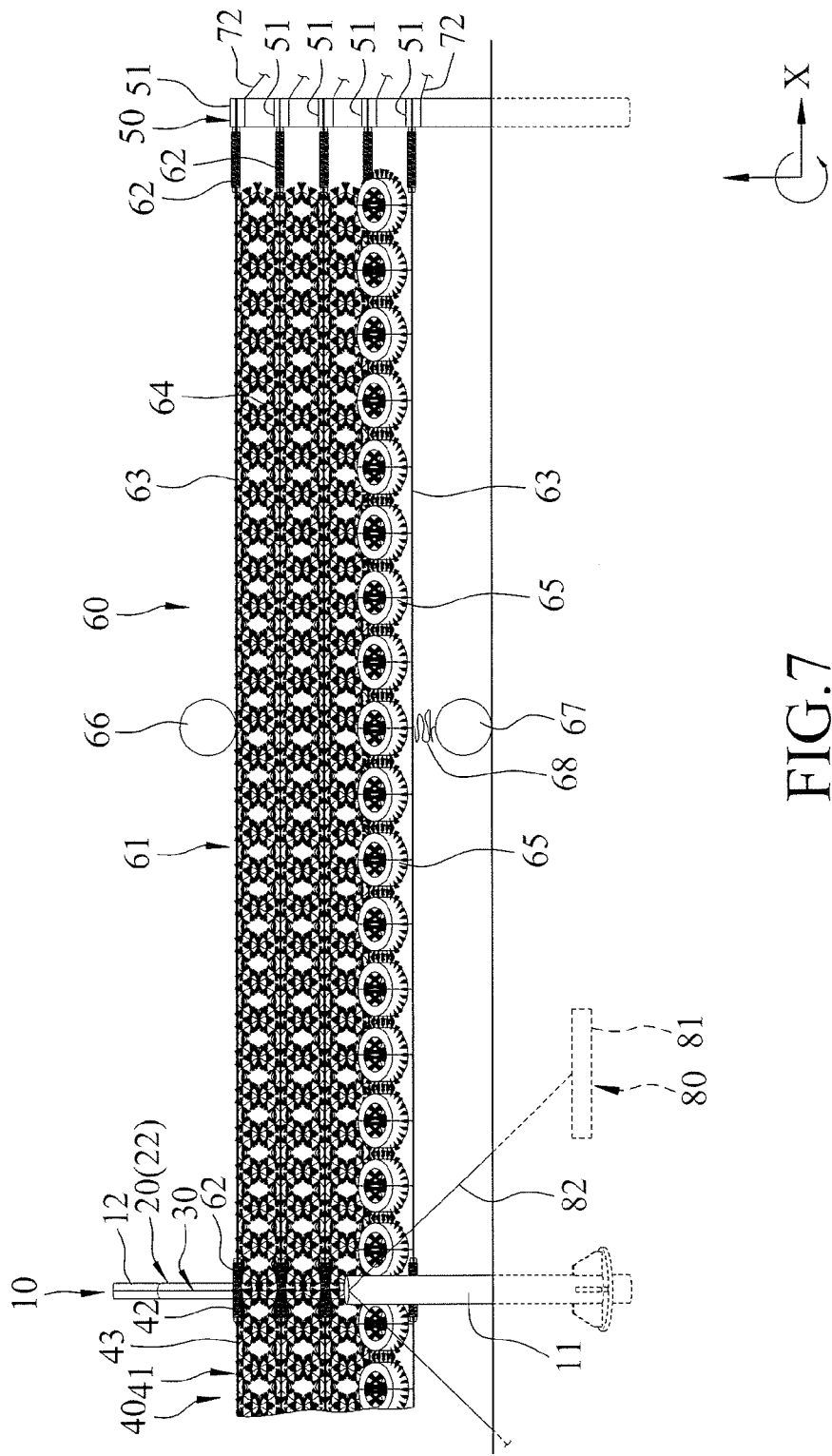
FIG. 7 is a fragmentary front view of the first preferred embodiment, illustrating the second energy dissipation device.

With additional reference to FIGS. 3, 4, and 5, the brace units 10 are disposed at a coastal bed 200' (see FIG. 5), and are spaced apart from each other along a horizontal direction (X). Each brace unit 10 includes a front brace 11 that is inclined forwardly and upwardly, a rear brace 12 disposed behind and spaced apart from the front brace 11 and inclined rearwardly and upwardly, and two stabilizers 13 disposed respectively on the front and rear braces 11, 12.

Each front and rear brace 11, 12 has a lower end portion 111, 121.

The stabilizers 13 are disposed respectively on the lower end portions 111, 121 of the front and rear braces 11, 12. Each stabilizer 13 includes a base plate 131 disposed on the lower end portion 111, 121 of a corresponding one of the front and rear braces 11, 12, and a plurality of spaced-apart rib plates 132 disposed on a top surface of the base plate 131 and extending radially and outwardly from the lower end portion 111, 121 of the corresponding one of the front and rear braces 11, 12. In this embodiment, the stabilizers 13 are disposed for diminishing movement of sea sands away from the lower end portions 111, 121 of the front and rear braces 11, 12, so as to facilitate the front and rear braces 11, 12 to stand firmly at the coast 200.

With further reference to FIGS. 3 and 5, each inclined energy-dissipating post 20 is disposed between the front and rear braces 11, 12 of the corresponding brace unit 10, and includes a first spring unit 21 connected to the corresponding front brace 11, and a rod body 22 connected to the first spring unit 21 and aligned with the corresponding rear brace 12.

Each hanging cable unit 30 is disposed between the front and rear braces 11, 12 of the corresponding brace unit 10, and is connected to the rod body 22 of the corresponding inclined energy-dissipating post 20 such that the corresponding energy-dissipating post 20 is inclined rearwardly and upwardly (i.e., the upper end of the corresponding energy-dissipating post 20 is disposed behind the lower end of the corresponding energy-dissipating post 20).

In this embodiment, each hanging cable unit 30 includes a first cable 31 connected between an upper end of the corresponding rear brace 12 and the upper end of the corresponding rod body 22, a second cable 32 connected between the upper end of the corresponding rod body 20 and an upper end of the corresponding front brace 11, and a third cable 33 connected between the lower end of the corresponding rod body 22 and the upper end of the corresponding front brace 11. An inclination angle of each inclined energy-dissipating post 20 can be varied by adjusting the length of at least one of the first, second, and third cables 31, 32, 33 of the corresponding hanging cable unit 30.

With further reference to FIG. 4, each first energy dissipation device 40 includes a first energy-dissipating net unit 41 disposed between the rod bodies 22 of two adjacent inclined energy-dissipating posts 20 along the horizontal direction (X), and ten second spring units 42 each connected between the first energy-dissipating net unit 41 and a corresponding one of the rod bodies 22 of two adjacent inclined energy-dissipating posts 20.

The second spring units 62 are arranged in pairs. Each pair of the second spring units 62 are aligned with each other along the horizontal direction (X), and are disposed respectively on the rod bodies 22 of two adjacent inclined energy-dissipating posts 20. In this embodiment, the second spring units 42 of two adjacent first energy dissipation devices 40 disposed on the rod body 22 of one of the inclined energy-dissipating posts 20 are connected integrally to each other, and are fastened to the rod body 22 of the corresponding inclined energy-dissipating post 20.

Each first energy-dissipating net unit 41 includes five first connecting cables 43 arranged one above another and each connected between the corresponding pair of the second spring units 62 along the horizontal direction (X), three first energy-dissipating nets 44, a plurality of first waste tire units 45, an upper buoy 46 disposed on the uppermost first connecting cables 43, a lower buoy 47, and a buoy-retaining cable 48 connected between the lowermost connecting cable 43 and the lower buoy 47. In FIG. 1, some of the first energy-dissipating nets 44 and some of the first waste tire units 45 are removed for sake of brevity. The first energy-dissipating nets 44 may be replaced with a plurality of energy-dissipating brushes each configured as a bundle of nylon fish lines of about 25 cm.

Figure 8:
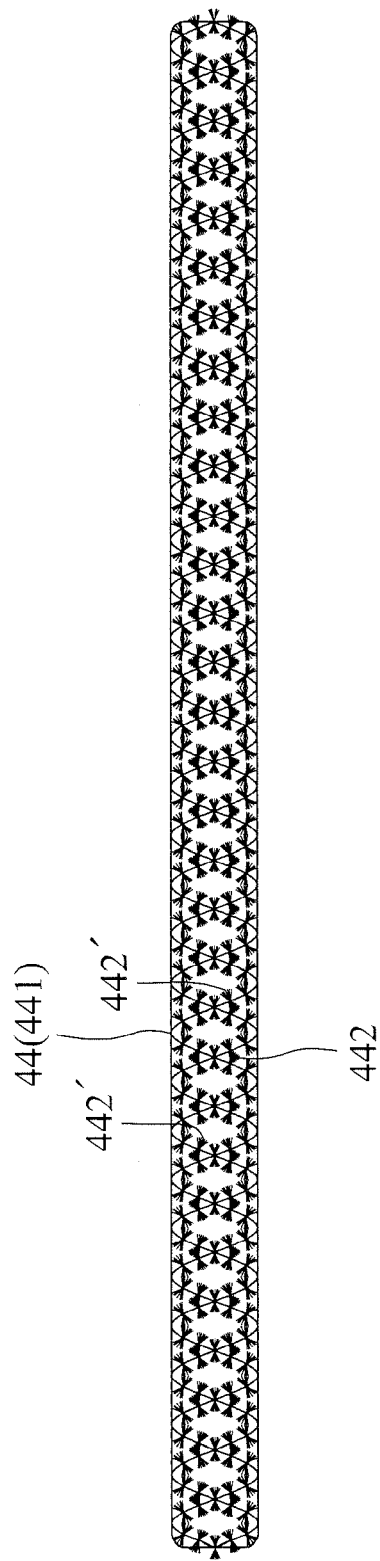
FIG. 8 is a schematic view of a first energy-dissipating net of the first preferred embodiment.
Figure 9:
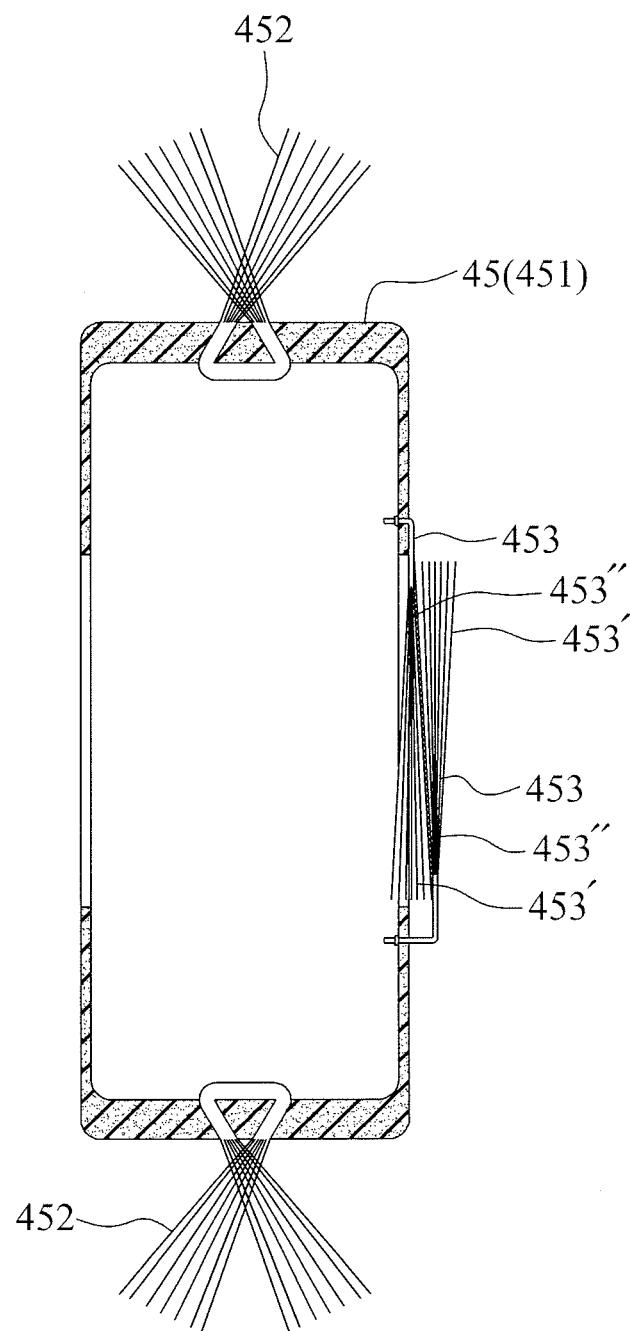
FIG. 9 is a schematic sectional view of a first waste tire unit of the first preferred embodiment.

Each first energy-dissipating net 44 is disposed between two adjacent ones of the uppermost four first connecting cables 43, and includes a net body 441 (see FIG. 8) disposed between the two adjacent ones of the uppermost four first connecting cables 43, and a plurality energy-dissipating cables 442 (see FIG. 8) disposed on the net body 441. Each energy-dissipating cable 442 includes a plurality of wires, and has two ends, at which ends 442' of the wires are spreaded. Alternatively, each energy-dissipating cable 442 includes a bundle of nylon fish lines of about 5.5 cm. With further reference to FIG. 9, each first waste tire unit 45 is disposed between the lowermost two first connecting cables 43, and includes a tire body 451, a plurality of lateral energy-dissipating cables 452 disposed on an outer peripheral surface of the tire body 451 and arranged along a circumferential direction of the tire body 451, and a plurality of front energy-dissipating cables 453 disposed on a front side surface of the tire body 451. Each front energy-dissipating cable 453 includes a plurality of wires, and has a spreaded end 453' and a non-spreaded end 453". At the spreaded end 453', the wires are spreaded. At the non-spreaded end 453", the wires are in contact with each other. The spreaded ends 453' of the front energy-dissipating cables 453 are arranged alternately with the non-spreaded ends 453" of the front energy-dissipating cables 453.

Each upper buoy 46 is disposed at a middle portion of the corresponding uppermost first connecting cable 43. Each lower buoy 47 is connected to a middle portion of the corresponding lowermost first connecting cable 43 by the corresponding buoy-retaining cable 48. With particular reference to FIG. 5, the upper and lower buoys 46, 47 are floated on a water surface 300, and are disposed to enable the first energy-dissipating nets 44 to move in response to occurrence of waves therearound.

With particular reference to FIGS. 1, 2, 6 and 7, the two positioning devices 50 are located respectively at two sides of the inclined energy-dissipating posts 20. Each positioning device 50 includes five positioning posts 51 spaced apart from each other. The positioning posts 51 have a height equal approximately to those of the inclined energy-dissipating posts 20.

The second energy dissipation devices 60 are located respectively at two sides of the inclined energy-dissipating posts 20, and are disposed between the positioning devices 50. Each second energy dissipation device 60 includes a second energy-dissipating net unit 61 disposed between the corresponding positioning device 50 and rod body 22 of the corresponding inclined energy-dissipating post 20 (i.e., a corresponding one of the two outermost inclined energy-dissipating posts 20), and ten third spring units 62 each connected between the energy-dissipating net units 61 and the corresponding positioning post 51 of the corresponding positioning device 50.

Each third spring unit 62 is disposed between the positioning post 51 of the corresponding positioning device 50 and the rod body 22 of the corresponding inclined energy-dissipating post 20. In this embodiment, five of the third spring units (i.e., the right spring units) 62 have left ends connected to the second energy-dissipating net unit 61, and right ends connected respectively to the corresponding positioning posts 51. The remaining five third spring units (i.e., the left spring units) 62 are connected respectively and integrally to the second spring units 42, and are fastened to the rod body 22 of the corresponding inclined energy-dissipating post 20.

The second energy-dissipating net unit 61 includes five spaced-apart second connecting cables 63 arranged one above another and each connected between a corresponding pair of the third spring units 62, three second energy-dissipating net 64, a plurality of second waste tire units 65, an upper buoy 66 disposed on the uppermost second connecting cable 63, a lower buoy 67, and a buoy-retaining cable 68 connected between the lower buoy 67 and the lowermost second connecting cable 63. In FIG. 1, some of the second energy-dissipating nets 64 and some of the second waste tire units 65 are removed from sake of brevity.

The second waste tire units 65 are disposed between the lowermost two second connecting cables 63, and are arranged along the horizontal direction (X). Each second energy-dissipating net 64 is disposed between two adjacent ones of the uppermost four second connecting cables 63. Since the second energy-dissipating nets 64 and the second waste tire units 65 are respectively similar to the first energy-dissipating nets 44 and the second waste tire units 45, further description thereof will be omitted.

With particular to FIG. 1, the two lateral pile devices 70 are located respectively at two sides of the positioning devices 50. Each lateral pile device 70 includes five lateral piles 71, and five pile-coupling cables 72 each connected to a respective lateral pile 71 and a respective positioning post 51 of the corresponding positioning device 50.

The front pile devices 80 correspond respectively to the brace units 10. Each front pile device 80 includes two front piles 81, and two pile-coupling cables 82 connecting the front piles 81 respectively to the front brace 11 of the corresponding brace unit 10.

The rear pile devices 90 are aligned respectively with the brace units 10. Each rear pile device 90 includes two rear piles 91, and two pile-coupling cables 92 connecting the rear piles 91 respectively to the rear brace 12 of the corresponding brace unit 10.

In view of the above, the flexible wave-energy dissipation system of this invention has the following advantages:

1. The first and second energy-dissipating nets 41, 61 of first and second energy dissipation devices 40, 60 cooperate to constitute a porous energy-dissipating construction. Furthermore, since each of the first energy-dissipating nets 44 and the first waste tire units 45 of the first energy-dissipating net units 41 is connected between two of the second spring units 42, and since each of the second energy-dissipating units 64 and the second waste tire units 65 of the second energy-dissipating net units 61 is connected between two of the third spring units 62, each of the first and second energy-dissipating nets 44, 64 and the first and second waste tire units 45, 65 can swing independently, so that energy of waves passing through the first and second energy-dissipating nets 44, 64 and the first and second waste tire units 45, 65 can be dissipated. In this manner, wave erosion damage can be diminished to maintain stability of the coastline.

2. Through dissipation of wave energy by the first and second energy dissipation devices 40, 60, if sea sands are carried by waves to pass through the flexible wave-energy dissipation system, a majority of the sea sands will be left on the coastal bed 200' when the waves return.

3. Due to the presence of the upper and lower buoys 46, 47, 66, 67 of the first and second energy dissipation devices 40, 60 floating on the water surface 300, the first and second energy-dissipating nets 44, 64 can be prevented from being embedded within sea sands, thereby ensuring that the flexible wave-energy dissipation system can dissipate wave energy effectively.

It should be noted that, the flexible wave-energy dissipation system may be disposed at a riverside or an outer side of a sea embankment.

Figure 10:
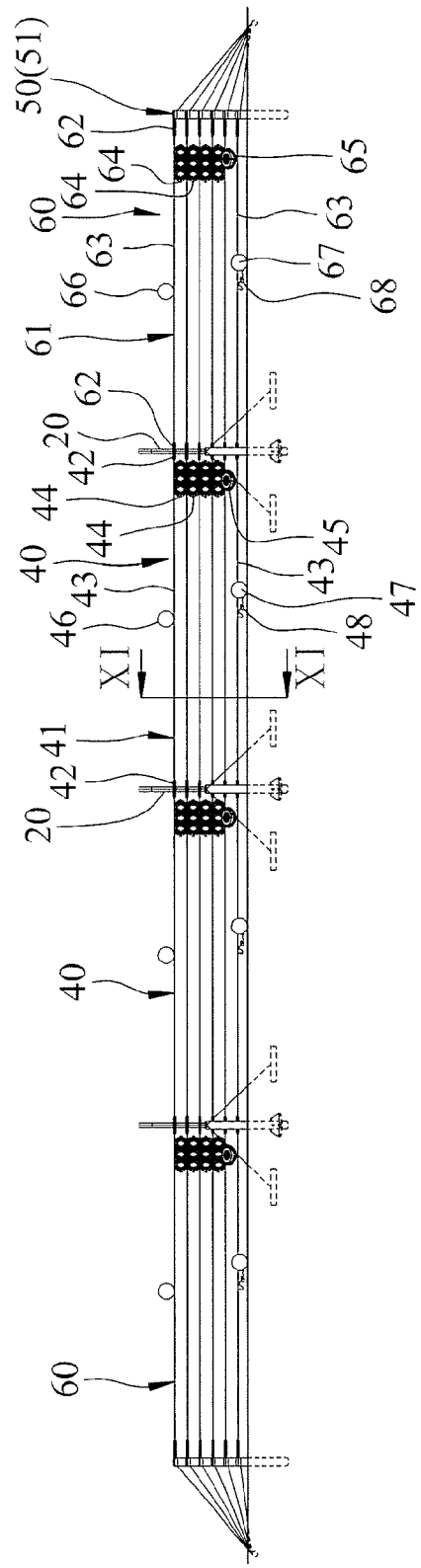
FIG. 10 is a top view of the second preferred embodiment of a flexible wave-energy dissipation system according to this invention when it is disposed on a coast.
Figure 11:
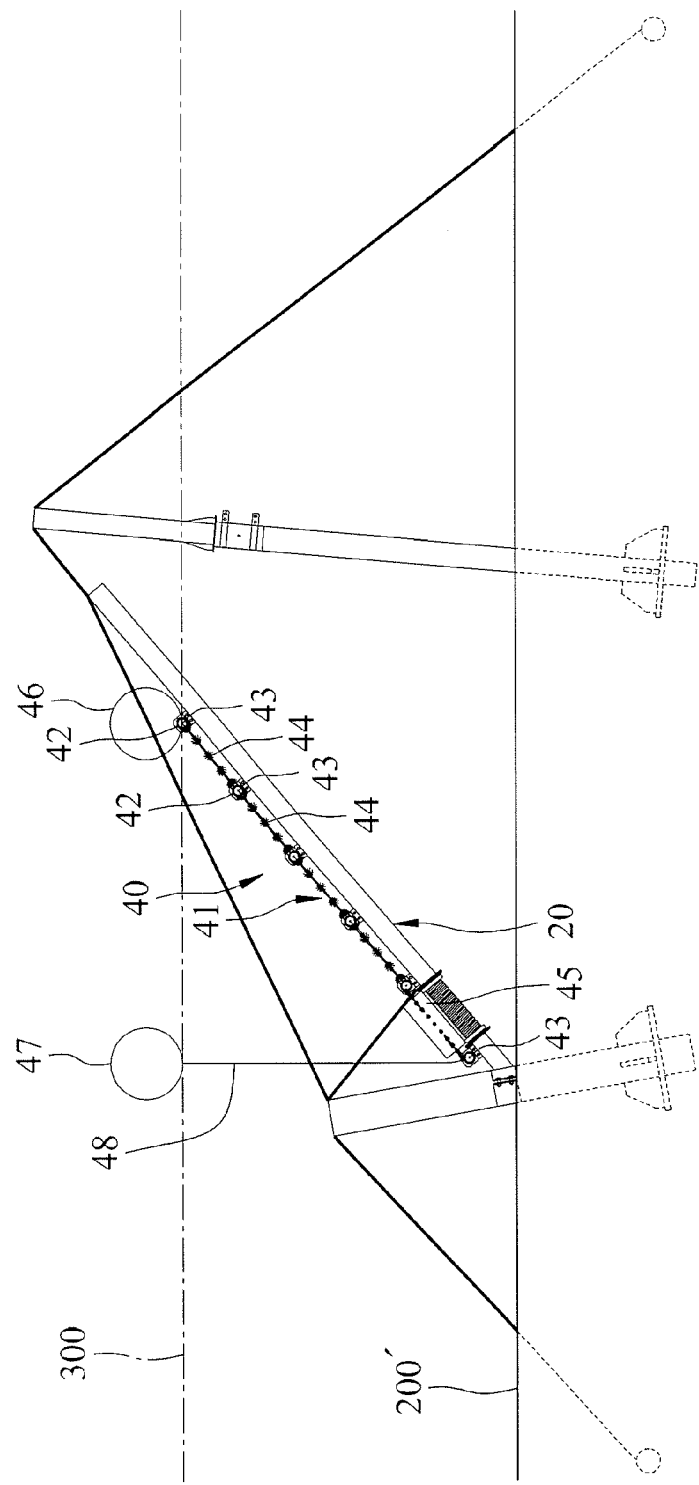
FIG. 11 is a sectional view taken along line XI-XI in FIG. 10.

FIGS. 10 and 11 show the second preferred embodiment of a flexible wave-energy dissipation system according to this invention, which differs from the first preferred embodiment in the following.

Each first energy dissipation device 40 includes a first energy-dissipating net unit 41 disposed between two adjacent inclined energy-dissipating posts 20, and twelve second spring units 62 each connected between the first energy-dissipating net unit 41 and the corresponding inclined energy-dissipating post 20.

The second spring units 62 are arranged in pairs. Each pair of the second spring units 62 are aligned with each other along the horizontal direction (X), and are disposed respectively on two adjacent inclined energy-dissipating posts 20.

Each first energy-dissipating net unit 41 includes six first connecting cables 43 arranged one above another and each connected between a corresponding pair of the second spring units 62, four first energy-dissipating nets 44, a plurality of first waste tire units 45, an upper buoy 46 disposed on the uppermost first connecting cable 43, a lower buoy 47, and a buoy-retaining cable 48 connected between the lower buoy 47 and the lowermost first connecting cable 43. In FIG. 10, some of the first energy-dissipating nets 44 and the first waste tire units 45 are removed for sake of brevity.

Each first energy-dissipating net 44 is disposed between two adjacent ones of the uppermost five first connecting cables 43 of the corresponding first energy dissipation device 40. Each first waste tire unit 45 is disposed between the lowermost two first connecting cables 43 of the corresponding first energy dissipation device 40.

Each second energy dissipation device 60 includes a second energy-dissipating unit 61 disposed between the corresponding positioning device 50 and the corresponding inclined energy-dissipating post 20, and twelve third spring units 62. Six of the third spring units (i.e., the right third spring units) 62 have left ends connected to the second energy-dissipating net unit 61, and right ends connected respectively to the corresponding positioning posts 51. The remaining six third spring units (i.e., the left third spring units) 62 have right ends connected to the second energy-dissipating net unit 61, and left ends connected to the leftmost inclined energy-dissipating post 20.

Each second energy-dissipating net unit 61 includes six second connecting cables 63 arranged one above another and each connected between a corresponding pair of the three spring units 62, four second energy-dissipating nets 64, a plurality of second waste tire units 65, an upper buoy 66 disposed on the uppermost second connecting cable 63, a lower buoy 67, and a buoy-retaining cable 68 connected between the lower buoy 67 and the lowermost second connecting cable 63. In FIG. 10, some of the second energy-dissipating nets 64 and some of the second waste tire units 65 are removed for sake of brevity.

Each second energy-dissipating net 64 is disposed between two adjacent ones of the uppermost five second connecting cables 63. Each second waste tire unit 65 is disposed between the lowermost two second connecting cables 63.

As such, the second preferred embodiment can achieve the same function and effect as the first preferred embodiment.

Figure 12:
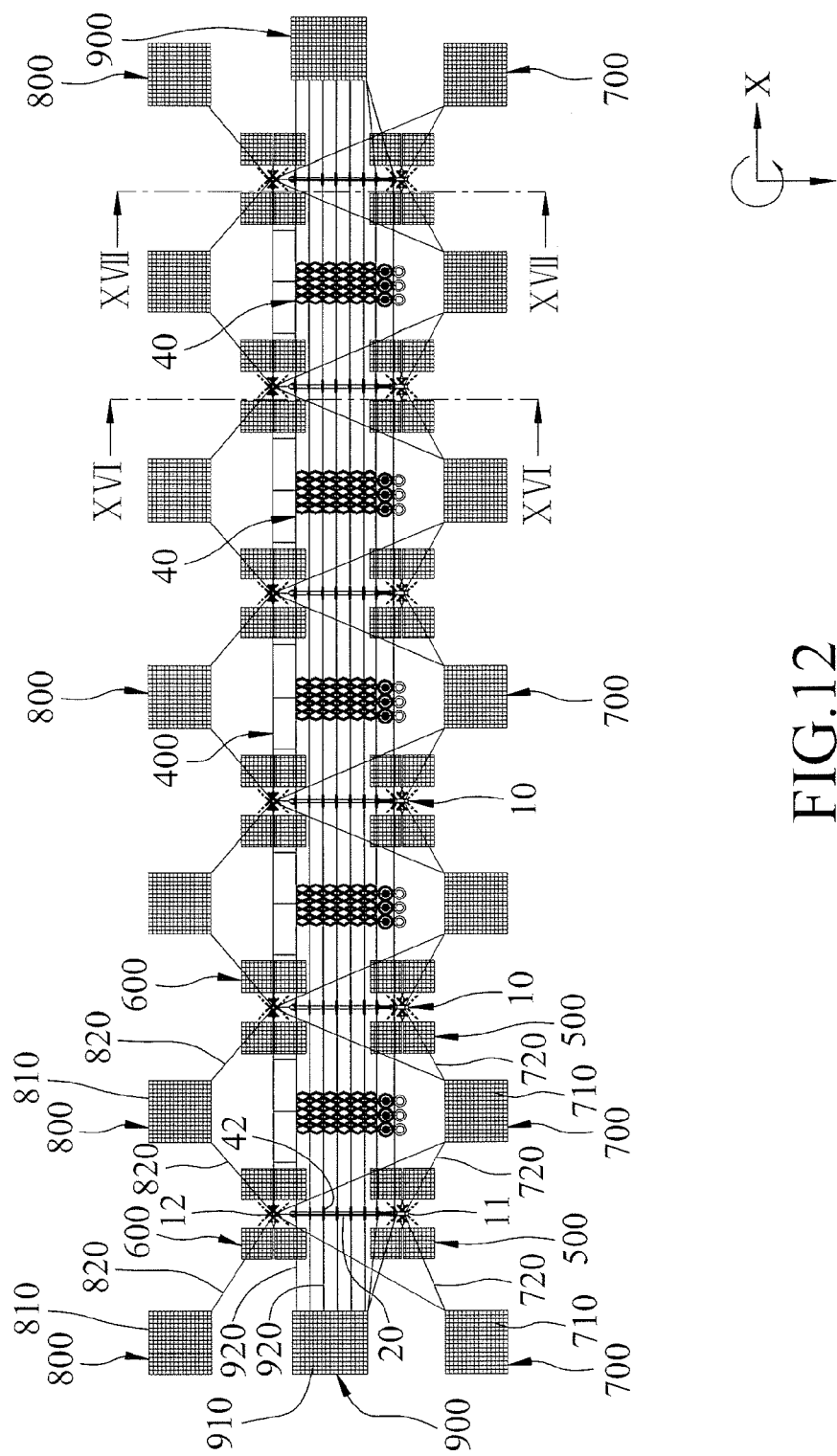
FIG. 12 is a top view of the third preferred embodiment of a flexible wave-energy dissipation system according to this invention when it is disposed on a coast.
Figure 13:
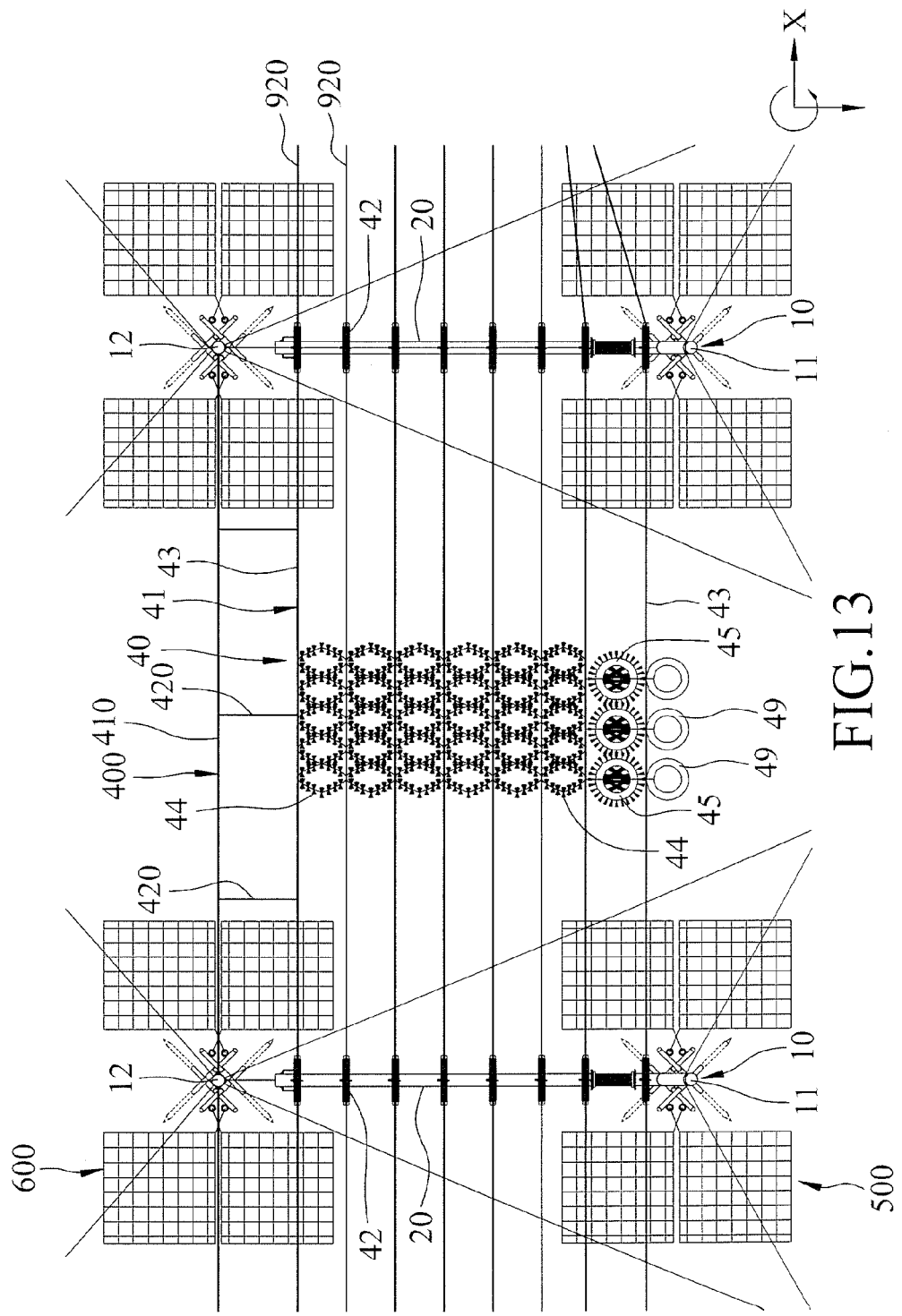
FIG. 13 is a fragmentary top view of the third preferred embodiment.

FIGS. 12 and 13 show the third preferred embodiment of a flexible wave-energy dissipation system according to this invention, which differs from the first preferred embodiment in the following.

The third preferred embodiment further includes a suspension unit 400, a plurality of auxiliary front cage devices 500 corresponding respectively to the brace units 10, a plurality of auxiliary rear cage devices 600 corresponding respectively to the brace units 10, a plurality of main front cage devices 700 disposed respectively in front of the brace units 10, a plurality of main rear cage devices 800 disposed respectively behind the brace units 10, and a plurality of lateral cage devices 900 located respectively at two sides of the inclined energy-dissipating posts 20.

Figure 14:
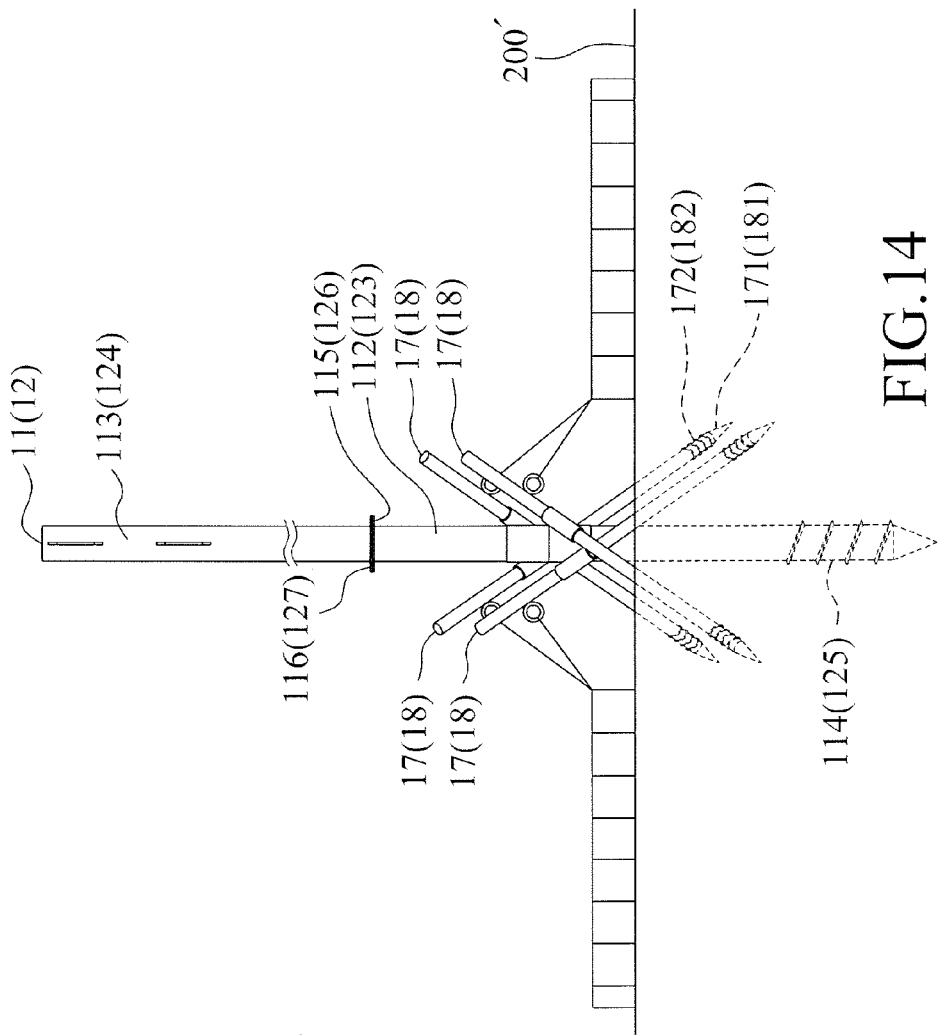
FIGS. 14 and 15 are respectively fragmentary schematic front and top views of the third preferred embodiment, illustrating that a front brace is confined among a plurality of front positioning piles and a rear brace is confined among a plurality of rear positioning piles.
Figure 15:
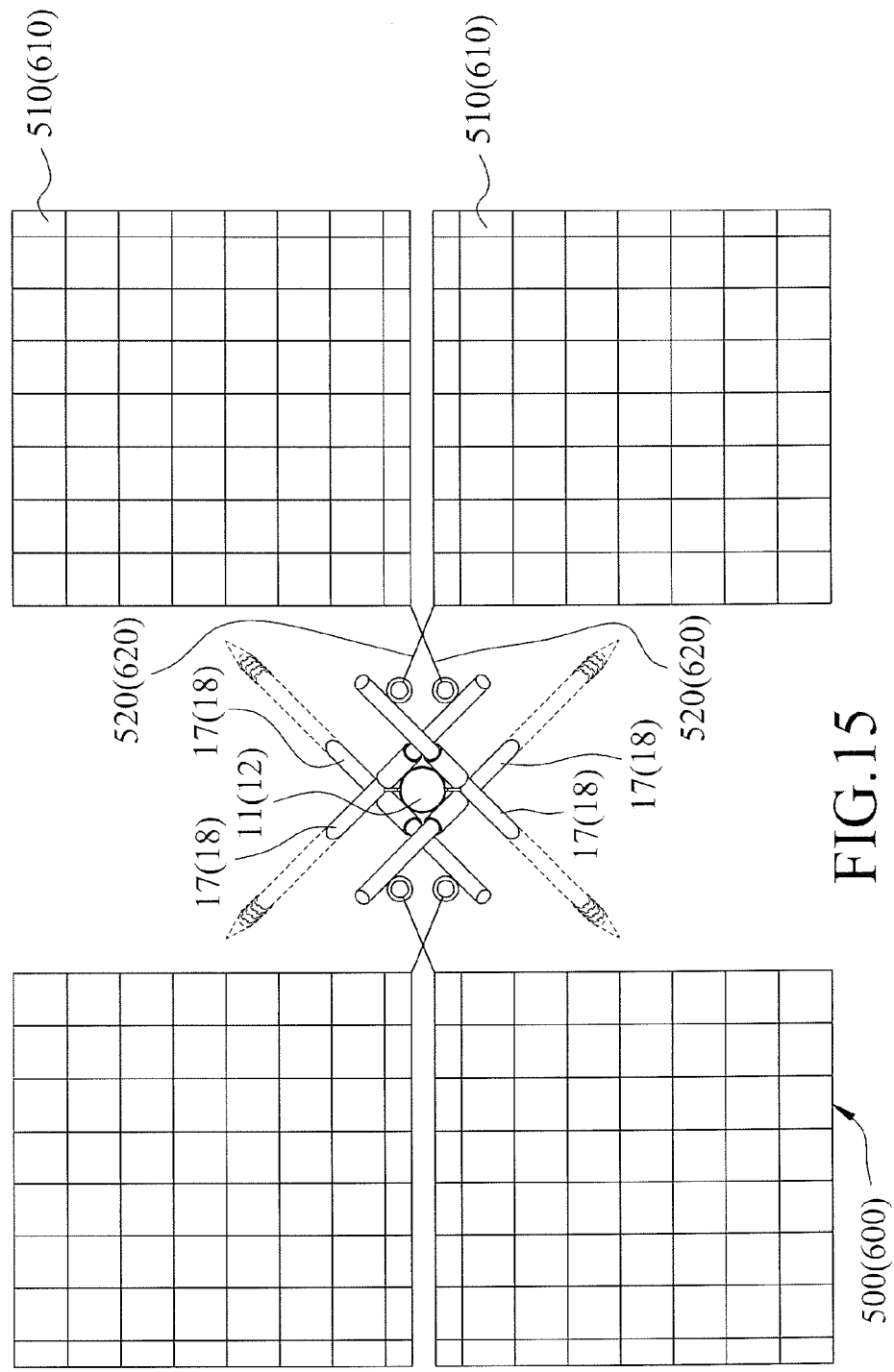
Figure 16:
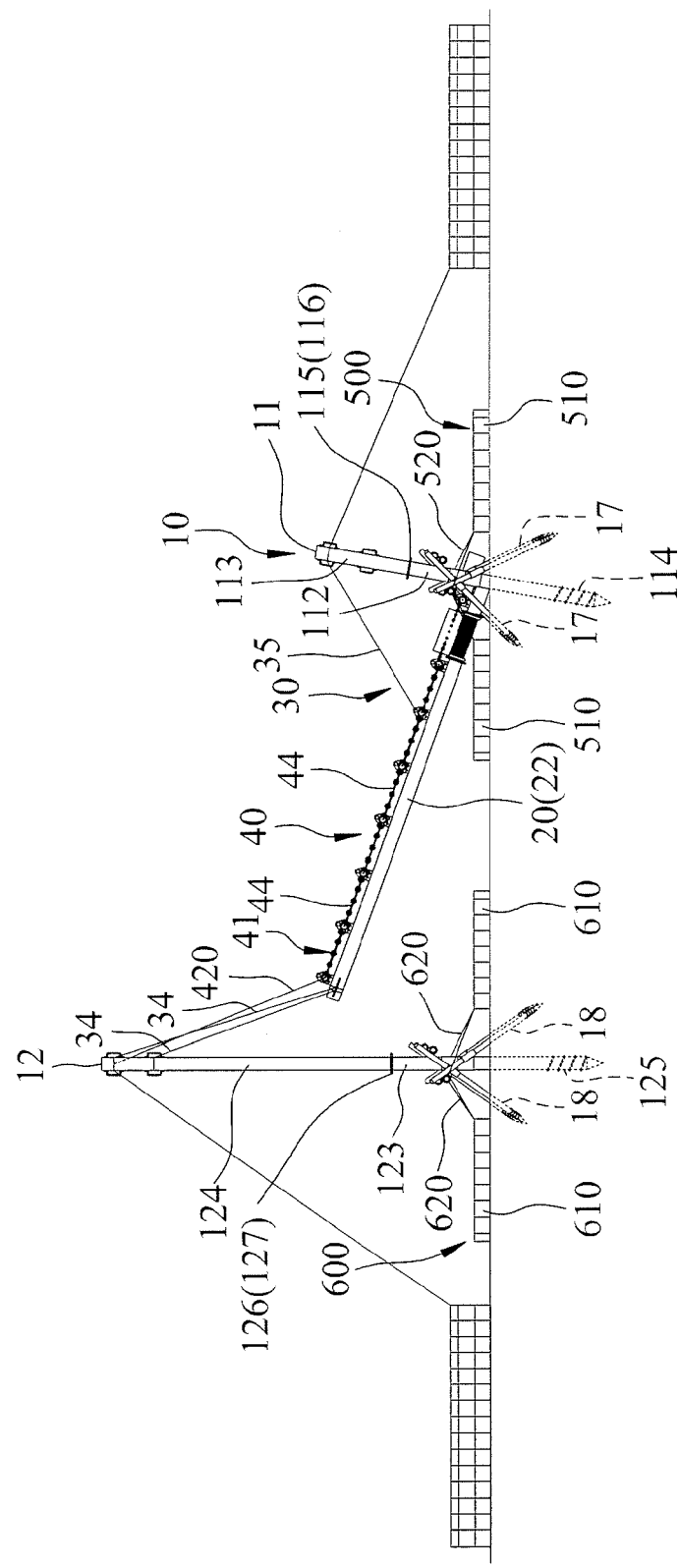
FIG. 16 is a sectional view taken along line XVI-XVI in FIG. 12.

With further reference to FIGS. 14, 15, and 16, each brace unit 10 further includes a plurality of front positioning piles 17 abutting against and surrounding the corresponding front brace 11, and a plurality of rear positioning piles 18 abutting against and surrounding the corresponding rear brace 12. Each of the front and rear positioning piles 17, 18 has a sharp lower end 171, 181, and a threaded section 172, 182 disposed immediately above the sharp lower end 171, 181. Each front brace 11 has a lower brace section 112, and an upper brace section 113 disposed removably on and above the lower brace section 112.

Each lower brace section 112 has a threaded lower end 114 inserted into the coastal bed 200', and an upper end flange 115 extending radially and outwardly from an upper end thereof. Each upper brace section 113 has a lower end flange 116 extending radially and outwardly from a lower end thereof and connected removably to the upper end flange 115, e.g., by bolts.

Each rear brace 12 has a lower brace section 123 and an upper brace section 124 disposed removably on the lower brace section 123.

Each lower brace section 123 has a threaded lower end 125 inserted into the coastal bed 200', and an upper end flange 126 extending radially and outwardly from an upper end thereof. Each upper brace section 124 has a lower end flange 127 extending radially and outwardly from a lower end thereof and connected removably to the upper end flange 126, e.g., by bolts.

It should be noted that, when the sea sands are accumulated to a level align with the upper and lower end flanges 115, 116, the upper brace sections 113, 124 may be removed from the lower brace sections 112, 123 to maintain a pleasing landscape.

Each front positioning pile 17 is inserted into the coastal bed 200', and abuts against the lower brace section 112 of the corresponding front brace 11. In this embodiment, each brace unit 10 includes four front positioning piles 17. Two of the four front positioning piles 17 cross each other, and are disposed in front of the corresponding front brace 11. The remaining two front positioning piles 17 cross each other, and are disposed behind the corresponding front brace 11.

Each rear positioning pile 18 is inserted into the coastal bed 200', and abuts against the lower brace section 123 of the corresponding rear brace 12. In this embodiment, each brace unit 10 includes four rear positioning piles 18. Two of the four rear positioning piles 18 cross each other, and are disposed in front of the corresponding rear brace 12. The remaining two rear positioning piles 18 cross each other, and are disposed behind the corresponding rear brace 12. The front and rear positioning piles 17, 18 facilitate the front and rear braces 11, 12 to stand more firmly at the coastal bed 200'.

Figure 17:
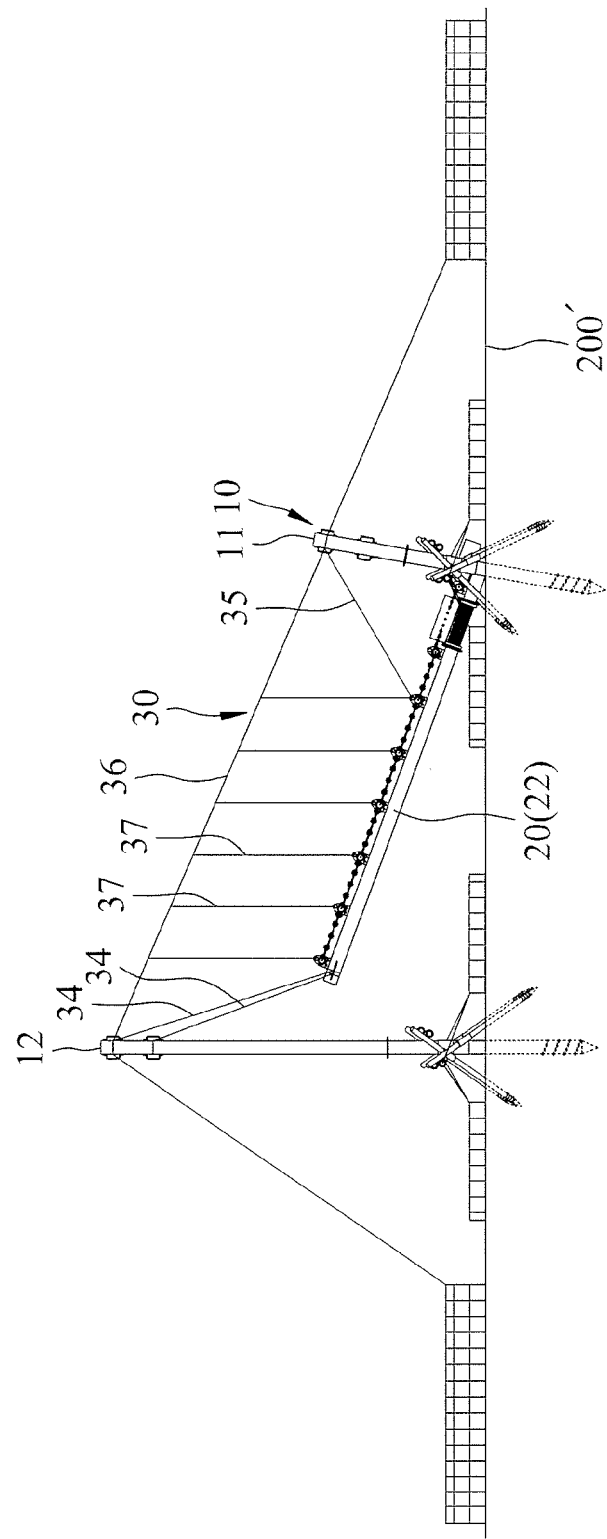
FIG. 17 is a sectional view taken along line XVII-XVII in FIG. 12.

With particular reference to FIGS. 16 and 17, each hanging cable unit 30 includes two rear hanging cables 34 connected between the upper end of the rear brace 12 and the upper end of the rod body 22 of the corresponding inclined energy-dissipating post 20, and a front hanging cable 35 connected between the lower end of the rod body 22 of the corresponding inclined energy-dissipating post 20 and the upper end of the corresponding brace 11.

With particular reference to FIG. 17, each of the two outermost hanging cable units 30 further includes a top cable 36 disposed above and generally parallel to the rod body 22 of the corresponding inclined energy-dissipating post 20 and connected between the upper ends of the front and rear braces 11, 12, and a plurality of hanging cables 37 connected between the top cable 36 and the rod body 22 the corresponding inclined energy-dissipating post 20.

With particular reference to FIGS. 12 and 13, each first energy dissipation device 40 includes a first energy-dissipating net unit 41 disposed between two adjacent inclined energy-dissipating posts 20, and sixteen second spring units 42 connected between the first energy-dissipating net unit 41 and two adjacent inclined energy-dissipating posts 20. The second spring units 42 are arranged in pairs. Each pair of the second spring units 42 are aligned with each other along the horizontal direction (X), and are disposed respectively on two adjacent inclined energy-dissipating posts 20.

Each first energy-dissipating net unit 41 includes eight first connecting cables 43 arranged one above another and each connected between a corresponding pair of the second spring units 42, six first energy-dissipating nets 44, a plurality of first waste tire units 45, and a plurality of lower waste tires 49. In FIGS. 12 and 13, some of the first energy-dissipating nets 44, some of the first waste tire units 45, and the lower waste tires 49 are removed for brevity.

Each first energy-dissipating net 44 is disposed between two adjacent ones of the uppermost seven first connecting cables 43 of the corresponding first energy-dissipating net unit 41. Each first waste tire unit 45 is disposed between the lowermost two first connecting cables 43. Each lower waste tire 49 is disposed on the lowermost first connecting cable 43.

With particular reference to FIGS. 13 and 16, the suspension unit 400 includes a horizontal hanging cable 410 connected between the upper ends of the rear braces 12 of the brace units 10 along the horizontal direction (X), and a plurality of hanging cables 420 spaced apart from each other and connected between the horizontal hanging cable 410 and upper ends of the first energy-dissipating net units 41. As such, each first energy-dissipating net unit 41 can be pulled by the hanging cables 420 of the suspension unit 400 to prevent a portion of each first energy-dissipating net unit 41 disposed between two adjacent inclined energy-dissipating posts 20 from sagging, thereby promoting the energy dissipating effect.

With particular reference to FIGS. 15 and 16, each auxiliary front cage device 500 includes a plurality of auxiliary front cages 510 placed on the coastal bed 200', and a plurality of cage-coupling cables 520 each connected between a respective auxiliary front cage 510 and a respective front positioning pile 17 of the corresponding brace unit 10. Each auxiliary rear cage device 600 includes a plurality of auxiliary rear cages 610 placed on the coastal bed 200', and a plurality of cables 620 each connected between a respective auxiliary rear cage 610 and a respective rear positioning pile 18 of the corresponding brace unit 10.

With particular reference to FIG. 12, each main front cage device 700 includes a front cage 710 placed on the coastal bed 200', and a plurality of cables 720 connecting the front cage 710 to the front and rear braces 11, 12 of two adjacent brace units 10. Each rear cage device 800 includes a rear cage 810 placed on the coastal bed 200', and a plurality of cables 820 connecting the rear cage 810 to the rear braces 12 of two adjacent brace units 10. Each lateral cage device 900 includes a lateral cage 910 placed on the coastal bed 200' and filled with pebbles (not shown), and a plurality of cables 920 connected respectively to the second spring units 42 of an adjacent inclined energy-dissipating post 20.

As such, the third preferred embodiment also can achieve the same object and effect as the first preferred embodiment.

Figure 18:
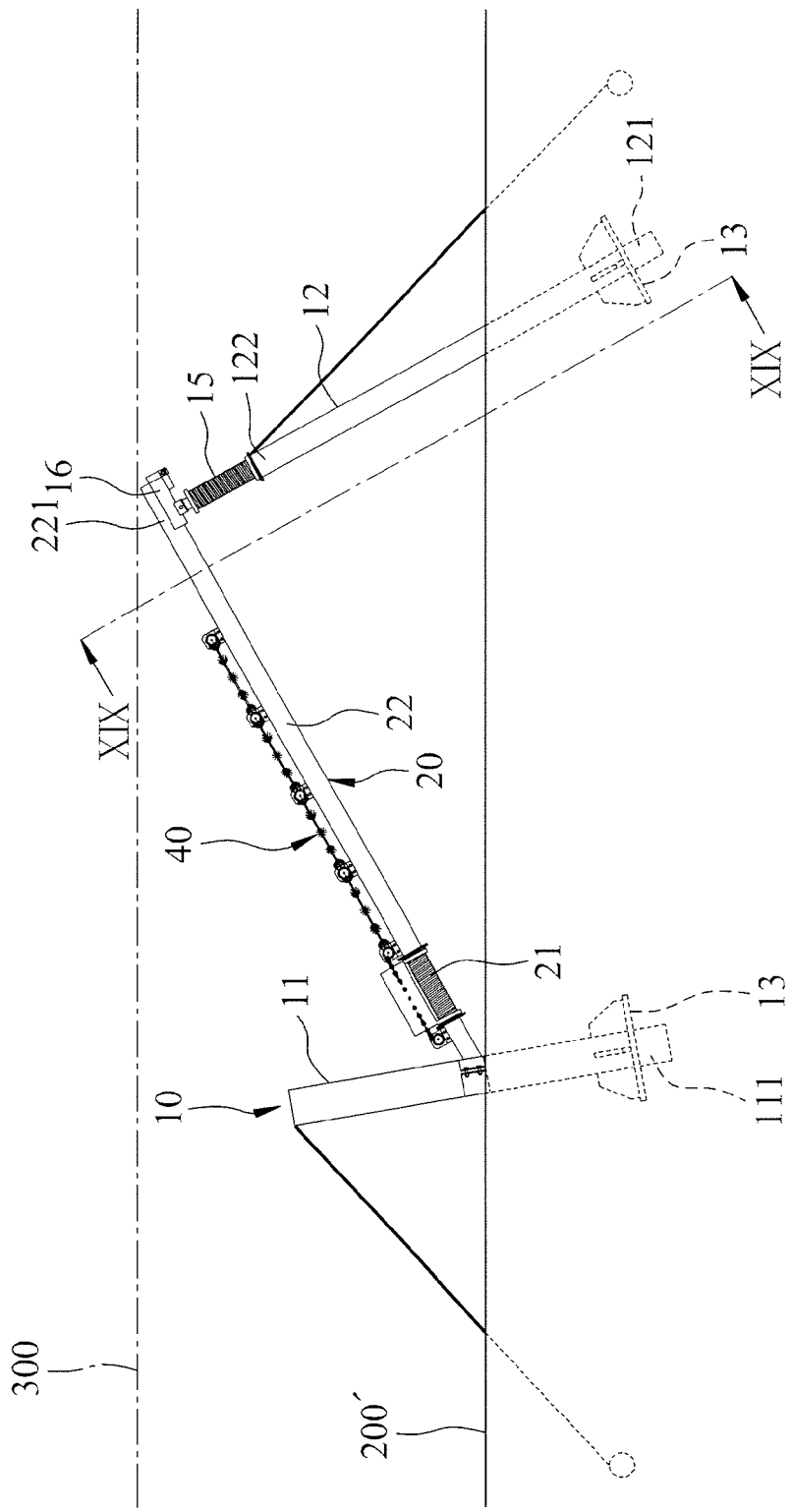
FIG. 18 is a fragmentary sectional view of the fourth preferred embodiment of a flexible wave-energy dissipation system according to this invention.
Figure 19:
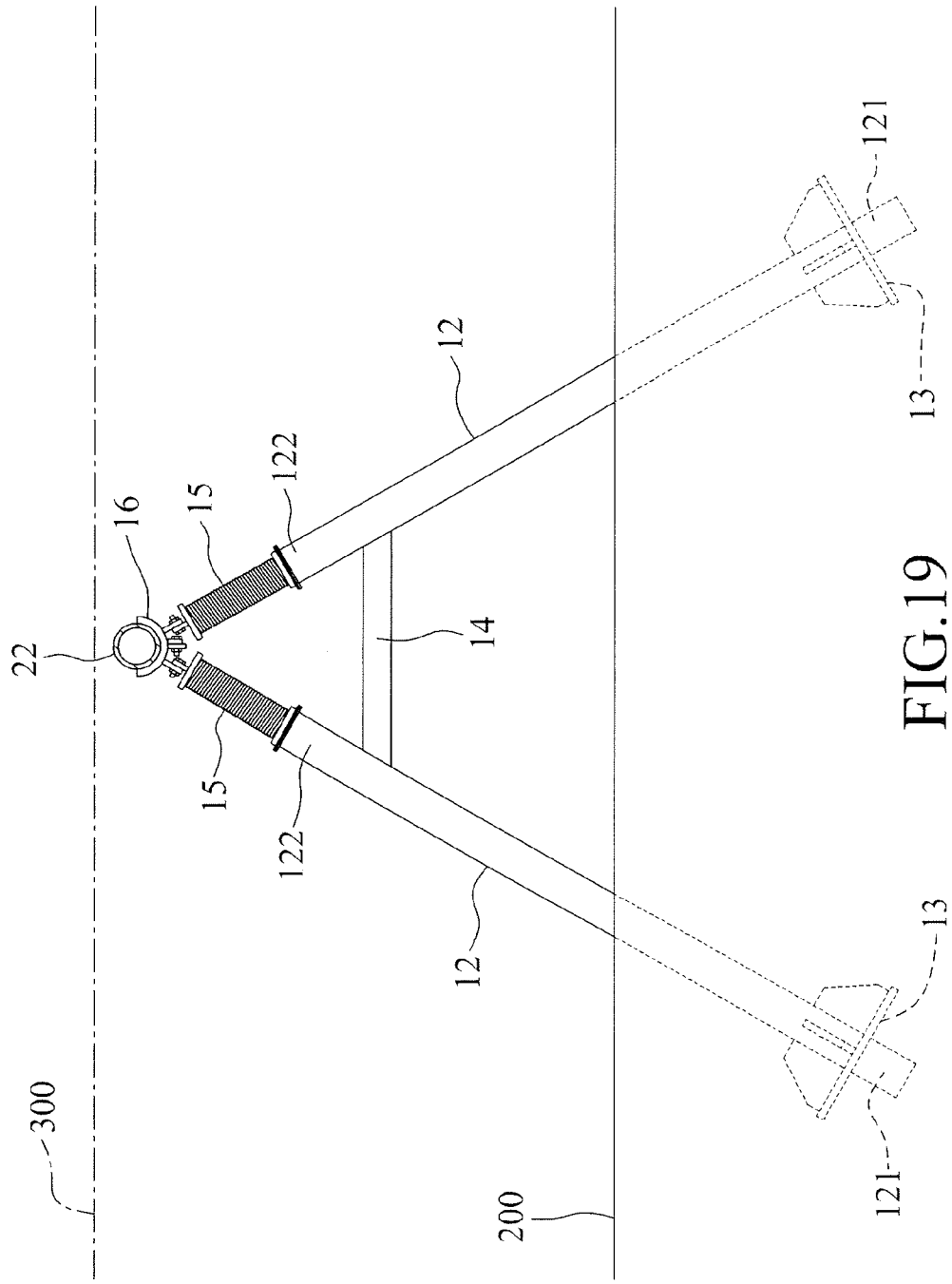
FIG. 19 is a sectional view taken along line XIX-XIX in FIG. 18.

FIGS. 18 and 19 show the fourth preferred embodiment of a flexible wave-energy dissipation system according to this invention, which differs from the first preferred embodiment in the following.

The hanging cable unit 30 is omitted from this embodiment.

Each brace unit 10 includes a front brace 11, two rear braces 12 disposed behind and spaced apart from the front brace 11, three stabilizers 13 disposed respectively on the front and rear braces 11, 12, a horizontal rod 14 connected between the rear braces 12, two auxiliary spring units 15 disposed respectively on upper ends of the rear braces 12, and a connecting piece 16 disposed on and above the auxiliary spring units 15.

Each front brace 11 has a lower end portion 111. Each rear brace 12 has a lower end portion 121 and an upper end portion 122. The rear braces 12 of each brace unit 10 are inclined upwardly and inwardly toward each other.

The stabilizers 13 are disposed respectively on the lower end portions 111, 122 of the front and rear braces 11, 12.

Each horizontal rod 14 is connected between the upper end portions 122 of two rear braces 12 to form an A-shaped structure.

Each auxiliary spring unit 15 is configured as a coiled compression spring, and has an upper end connected to the corresponding connecting piece 16.

Each inclined energy-dissipating post 20 is disposed between the front brace 11 and the auxiliary spring units 15 of the corresponding brace unit 10, and is inclined upwardly and rearwardly. Each inclined energy-dissipating post 20 includes a first spring unit 21 connected to the front brace 11, and a rod body 22 disposed between the first spring unit 21 and the auxiliary spring units 15. The rod body 22 of each inclined energy-dissipating post 20 has an upper end portion 221. In this embodiment, each connecting piece 16 is disposed between the upper end portion 221 of the rod body 22 of the corresponding inclined energy-dissipating post 20 and the corresponding auxiliary spring units 15.

As such, the fourth preferred embodiment also can achieve the same object and effect as the first preferred embodiment.

In the fourth preferred embodiment, the auxiliary spring units 15 cooperate with the connecting pieces 16 to replace the hanging cable units 30 (see FIG. 1) of the first preferred embodiment. In this manner, the height of each rear brace 12 can be reduced effectively to prevent the rear braces 12 and the inclined energy-dissipating posts 20 from projecting from the water surface 300.

Furthermore, the auxiliary spring units 15 can facilitate dissipation of wave energy. Further, due to the presence of the auxiliary spring units 15, the inclined energy-dissipating posts 20 can be moved to conform with the direction of sea current, e.g., when encountering Typhoon winds.

Figure 20:
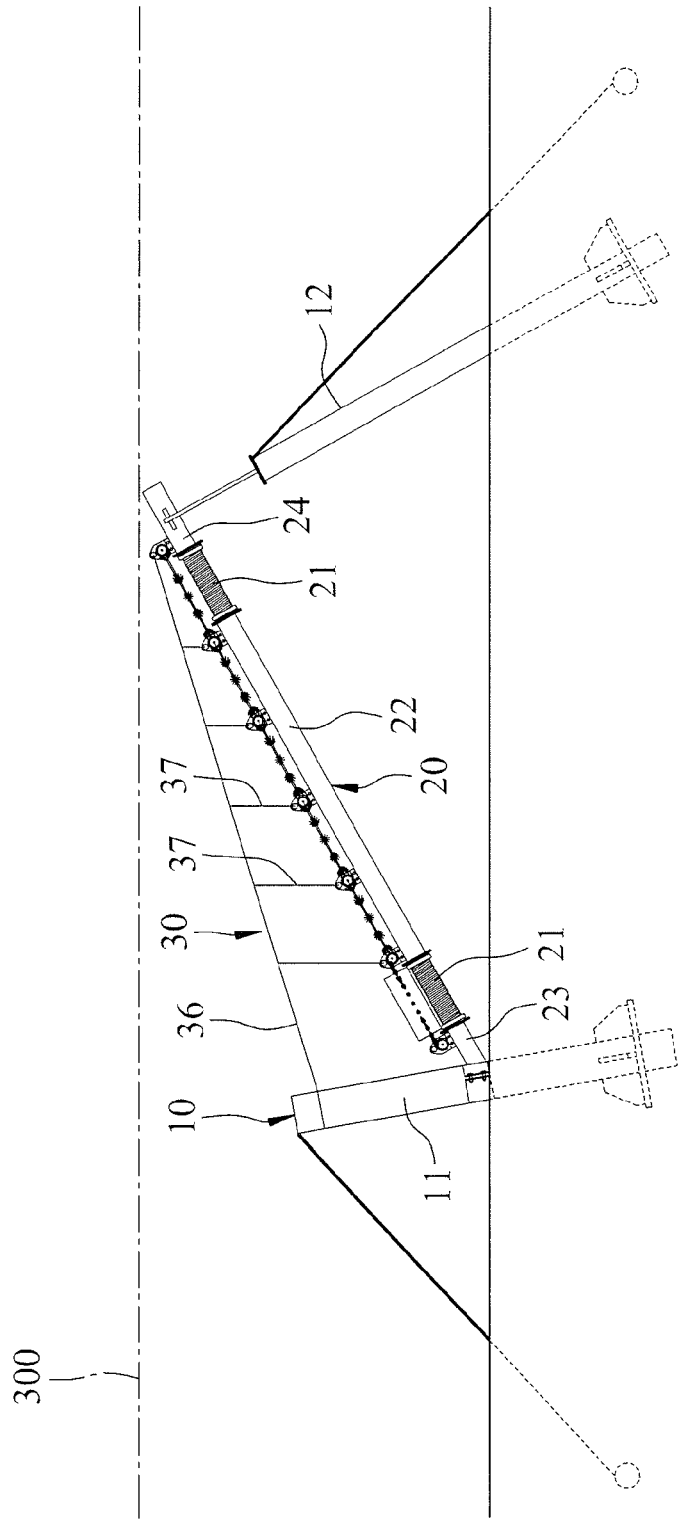
FIG. 20 is a fragmentary sectional view of the fifth preferred embodiment of a flexible wave-energy dissipation system according to this invention.

FIG. 20 shows the fifth preferred embodiment of a flexible wave-energy dissipation system according to this invention, which differs from the fourth preferred embodiment in the following.

The fifth preferred embodiment further includes a plurality of hanging cable units 30.

Each brace unit 10 includes only one front brace 11 and two rear braces 12 disposed behind and spaced apart from the front brace 11. In other words, with further particular to FIG. 19, the horizontal rod 14, the auxiliary spring units 15, and the connecting piece 16 are omitted from the brace unit 10.

Each inclined energy-dissipating post 20 is disposed between the front brace 11 and the two rear braces 12 of the corresponding brace unit 10, and includes two first spring units 21, a rod body 22 connected between the first spring units 21, a front connecting piece 23 connected between the front brace 11 and one of the first spring units 21, and a rear connecting piece 24 connected between the other of the first spring units 21 and the two rear braces 12.

Each hanging cable unit 30 includes a longitudinal cable 36 connected between a top end of the front brace 11 of the corresponding brace unit 10 and the rear connecting piece 24 of the corresponding inclined energy-dissipating post 20, and a plurality of hanging cables 37 connected between the longitudinal cable 36 and the rod body 22 of the corresponding inclined energy-dissipating post 20.

As such, the fifth preferred embodiment can achieve the same function and effect as the fourth preferred embodiment.

With this invention thus explained, it is apparent that numerous modifications and variations can be made without departing from the scope and spirit of this invention. It is therefore intended that this invention be limited only as indicated by the appended claims.

We claim:

1. A flexible wave-energy dissipation system comprising:
a plurality of brace units spaced apart from each other along a horizontal direction, each of said brace units including a front brace and a rear brace disposed behind said front brace;
a plurality of inclined energy-dissipating posts each disposed between said front and rear braces of a respective one of said brace units, each of said inclined energy-dissipating posts including a first spring unit connected to the respective one of said front braces of said brace units, and a rod body having a lower end that is connected to said first spring unit and extending toward the respective one of said rear braces;
a plurality of hanging cable units each disposed between said front and rear braces of a respective one of said brace units, each of said hanging cables being connected to a respective one of said inclined energy-dissipating posts such that the respective one of said inclined energy-dissipating posts is inclined upwardly and rearwardly; and
at least one first energy dissipation device including a first energy-dissipating net unit disposed between two adjacent ones of said inclined energy-dissipating posts along said horizontal direction, and a plurality of second spring units each connected between said first energy-dissipating net unit and an adjacent one of said inclined energy-dissipating posts.

2. The flexible wave-energy dissipation system as claimed in claim 1, wherein said second spring units are arranged in pairs, each pair of said second spring units being aligned with each other along said horizontal direction and being disposed respectively on two adjacent ones of said inclined energy-dissipating posts, said first energy-dissipating net unit including a plurality of first connecting cables arranged one above another and each connected between a respective pair of said second spring units along said horizontal direction, and a plurality of first energy-dissipating nets each disposed between two adjacent ones of said first connecting cables other than the lowermost one thereof.

3. The flexible wave-energy dissipation system as claimed in claim 1, wherein said second spring units are arranged in pairs, each pair of said second spring units being aligned with each other along said horizontal direction and being disposed respectively on two adjacent ones of said inclined energy-dissipating posts, said first energy-dissipating net unit including a plurality of first connecting cables arranged one above another and each connected between a respective pair of said second spring units along said horizontal direction, a plurality of first energy-dissipating nets each disposed between two adjacent ones of said first connecting cables other than the lowermost one thereof, and a plurality of first waste tire units arranged along said horizontal direction and disposed between the lowermost two of said first connecting cables, each of said first energy-dissipating nets being disposed between two adjacent ones of the remaining first connecting cables.

4. The flexible wave-energy dissipation system as claimed in claim 3, wherein each of said first energy-dissipating nets includes a net body disposed between two adjacent ones of said first connecting cables, and a plurality of energy-dissipating cables disposed on said net body, each of said energy-dissipating cables including a plurality of wires, and having two ends, at which ends of said wires are spreaded, each of said waste tire units including a tire body, a plurality of lateral energy-dissipating cables disposed on an outer peripheral surface of said tire body and arranged along a circumferential direction of said tire body, and a plurality of front energy-dissipating cables disposed on and in front of said tire body, each of said front energy-dissipating cables having a spreaded end and a no-spreaded end, and including a plurality of wires that are spreaded at said spreaded end and that are in contact with each other at said non-threaded end, said spreaded ends of said front energy-dissipating cables being arranged alternatively with said non-spreaded ends of said front energy-dissipating cables.

5. The flexible wave-energy dissipation system as claimed in claim 2, wherein said first energy-dissipating net unit further includes an upper buoy disposed on an uppermost one of said first connecting cables, a lower buoy, and a buoy-retaining cable connected between said lower buoy and the lowermost one of said first connecting cables.

6. The flexible wave-energy dissipation system as claimed in claim 1, wherein each of said hanging cable units includes a first cable connected between an upper end of a corresponding one of said rear braces and an upper end of said rod body of a corresponding one of said inclined energy-dissipating posts, a second cable connected between an upper end of said rod body of the corresponding one of said inclined energy-dissipating posts and an upper end of a corresponding one of said front braces, and a third cable connected between a lower end of said rod body of the corresponding one of said inclined energy-dissipating posts and said upper end of the corresponding one of said front braces.

7. The flexible wave-energy dissipation system as claimed in claim 3, further comprising two positioning devices located respectively at two sides of said inclined energy-dissipating posts, and two second energy dissipation devices located respectively at two sides of said inclined energy-dissipating posts, each of said second energy dissipation devices including a second energy-dissipating net unit disposed between a corresponding one of said positioning devices and a corresponding one of two outermost ones of said inclined energy-dissipating posts, and a plurality of third spring units, some of said third spring units having left ends connected to said second energy-dissipating net unit, and right ends connected to a corresponding one of said positioning devices, the remaining third spring units having right ends connected to said second energy-dissipating net unit, and left ends connected to a corresponding one of said inclined energy-dissipating posts.

8. The flexible wave-energy dissipation system as claimed in claim 7, wherein said third spring units of each of said second energy dissipation devices are arranged in pairs, each pair of said third spring units being aligned with each other along said horizontal direction and disposed between a corresponding one of said positioning devices and a corresponding one of said two outermost ones of said inclined energy-dissipating posts, said second energy-dissipating net unit including a plurality of second connecting cables arranged one above another and each connected between a corresponding one of said third spring units, a plurality of second energy-dissipating nets, and a plurality of second waste tire units, said second waste tire units being arranged along said horizontal direction and being disposed between the lowermost two of said second connecting cables, each of said second energy-dissipating nets being disposed between two adjacent ones of the remaining second connecting cables.

9. The flexible wave-energy dissipation system as claimed in claim 8, wherein each of said positioning devices includes a plurality of positioning posts, one of each pair of said third spring units being connected to a corresponding one of said positioning posts of a corresponding one of said positioning devices, the other of each pair of said third spring units being connected to the corresponding one of two outermost ones of said inclined energy-dissipating posts.

10. The flexible wave-energy dissipation system as claimed in claim 9, further comprising two lateral pile devices located respectively at two sides of said positioning devices, a plurality of front pile devices disposed respectively in front of and aligned respectively with said brace units, a plurality of rear pile devices disposed respectively behind and aligned respectively with said brace units, each of said lateral pile devices including at least one lateral pile and a plurality of pile-coupling cables each connected between said lateral pile and a respective one of said positioning posts of a corresponding one of said positioning devices, each of said front pile devices including at least one front pile and at least one pile-coupling cable connected between said front pile and said front brace of a corresponding one of said brace units, each of said rear pile devices including a rear pile and at least one pile-coupling cable connected between said rear pile and said rear brace of the corresponding one of said brace units.

11. The flexible wave-energy dissipation system as claimed in claim 1, wherein each of said brace units further includes two stabilizers disposed respectively on lower end portions of said front and rear braces, each of said stabilizers including a base plate disposed on a corresponding one of said front and rear braces and having a top surface, and a plurality of rib plates disposed on said top surface of said base plate and extending radially and outwardly from the corresponding one of said front and rear braces.

12. The flexible wave-energy dissipation system as claimed in claim 1, wherein each of said inclined energy-dissipating brace unit further includes a plurality of front positioning piles abutting against and surrounding said front brace, and a plurality of rear positioning posts abutting against and surrounding said rear brace.

13. The flexible wave-energy dissipation system as claimed in claim 12, wherein said front brace of each of said brace units has a lower brace section and an upper brace section disposed removably on and above said lower section of a corresponding one of said front braces such that said front positioning piles abut against said lower brace section, said lower brace section of each of said front braces has a threaded lower end adapted to be inserted into a coastal bed, each of said rear braces having a lower brace section and an upper brace section disposed removably on and above said lower brace section of a corresponding one of said rear braces such that said rear positioning piles abut against said lower brace section of the corresponding one of said rear braces, said lower brace section of each of said rear braces having a threaded lower end adapted to be inserted into the coastal bed.

14. The flexible wave-energy dissipation system as claimed in claim 12, further comprising a plurality of front cage devices corresponding respectively to said brace units, and a plurality of rear cage devices corresponding respectively to said brace units, each of said auxiliary front cage devices including a plurality of auxiliary front cages adapted to be placed on a coastal bed, and a plurality of cage-coupling cables each connected between a respective one of said auxiliary front cages and a respective one of said front positioning piles, each of said auxiliary rear cage devices including a plurality of auxiliary rear cages adapted to be placed on the coastal bed, and a plurality of cage-coupling cables each connected between a respective one of said auxiliary rear cages and a respective one of said rear positioning piles.

15. The flexible wave-energy dissipation system as claimed in claim 12, wherein each of two outermost ones of said hanging cable units includes a top cable connected between upper ends of said front and rear braces of a corresponding one of said brace units, and a plurality of hanging cables connected between said top cable and said rod body of the corresponding one of said inclined energy-dissipating posts.

16. The flexible wave-energy dissipation system as claimed in claim 12, further comprising a suspension unit, said suspension unit including a horizontal hanging cable connected between upper ends of said rear braces of said brace units along said horizontal direction, and a plurality of hanging cables spaced apart from each other and connected between said horizontal hanging cable and upper ends of said first energy-dissipating units.

17. A flexible wave-energy dissipation system comprising:
a plurality of brace units spaced apart from each other along a horizontal direction, each of said brace units including a front brace, two rear braces disposed behind and spaced apart from said front brace and inclined upwardly and inwardly toward each other, and two auxiliary spring units disposed respectively on upper ends of said rear braces;
a plurality of inclined energy-dissipating posts each disposed between said front brace and said auxiliary spring units of a corresponding one of said brace units and inclined upwardly and rearwardly, each of said inclined energy-dissipating posts including a first spring unit connected to said front brace of the corresponding one of said brace units, and a rod body disposed between said first spring unit and said two auxiliary spring units; and
at least one first energy dissipation device including a first energy-dissipating net unit disposed between two adjacent ones of said inclined energy-dissipating posts along said horizontal direction, and a plurality of a plurality of second spring units connected between said first energy-dissipating net unit and said two adjacent ones of said inclined energy-dissipating posts.

18. The flexible wave-energy dissipation system as claimed in claim 17, wherein each of said brace units further includes a connecting piece disposed between an upper end of said rod body of a corresponding one of said inclined energy-dissipating posts and upper ends of said auxiliary spring units of the corresponding one of said brace units.

19. The flexible wave-energy dissipation system as claimed in claim 17, wherein each of said brace units further includes a horizontal rod connected between upper end portions of said rear braces.

20. A flexible wave-energy dissipation system comprising:
a plurality of brace units spaced apart from each other along a horizontal direction, each of said brace units including a front brace and two rear braces disposed behind said front brace;
a plurality of inclined energy-dissipating posts each disposed between said front brace and said rear braces of a respective one of said brace units, each of said inclined energy-dissipating posts including two first spring units, and a rod body connected between said two first spring units, one of said two first spring units being adjacent to said front brace of a corresponding one of said brace units, the other of said two first spring units being adjacent to said rear braces of the corresponding one of said brace units; and
at least one energy dissipation device including an energy-dissipating net unit disposed between two adjacent ones of said inclined energy-dissipating posts along said horizontal direction, and a plurality of second spring units each connected between said energy-dissipating net unit and two adjacent ones of said inclined energy-dissipating posts.

* * * * *